US011938095B1

(12) United States Patent
Triplett

(10) Patent No.: US 11,938,095 B1
(45) Date of Patent: Mar. 26, 2024

(54) PILL SPLITTER

(71) Applicant: Studio 010 Inc., Provo, UT (US)

(72) Inventor: Tyson David Triplett, Provo, UT (US)

(73) Assignee: Studio 010 Inc., Provo, UT (US)

( * ) Notice: Subject to any disclaimer, the term of this patent is extended or adjusted under 35 U.S.C. 154(b) by 0 days.

(21) Appl. No.: 18/309,969

(22) Filed: May 1, 2023

Related U.S. Application Data

(62) Division of application No. 16/745,703, filed on Jan. 17, 2020, now Pat. No. 11,672,735.

(51) Int. Cl.
*A61J 7/00* (2006.01)

(52) U.S. Cl.
CPC .................................. *A61J 7/0007* (2013.01)

(58) Field of Classification Search
CPC ............... Y10T 225/12; Y10T 225/371; Y10T 225/379; Y10T 225/386; Y10T 225/30; Y10T 225/34; A61J 7/0007; B26F 3/00; B26D 1/01; B26D 3/24; B26D 3/245; B26D 3/30; B26D 5/10; A47J 43/044; A47J 2043/04409
USPC .................................................... 30/124, 114
See application file for complete search history.

(56) References Cited

U.S. PATENT DOCUMENTS

| | | | |
|---|---|---|---|
| 632,444 | A | 9/1899 | Chaussinand |
| 2,799,923 | A | 7/1957 | Senshu |
| 2,985,957 | A | 5/1961 | Freedman |
| 3,031,754 | A | 5/1962 | Pocoski |
| 3,169,312 | A | 2/1965 | Fink |
| 3,336,666 | A | 8/1967 | Calkin |
| 3,392,447 | A | 7/1968 | Hendricks et al. |
| 3,517,871 | A | 6/1970 | Gaffney et al. |
| 3,777,398 | A | 12/1973 | Routh |
| 3,943,948 | A | 3/1976 | Sartore |
| 4,009,651 | A | 3/1977 | Adams |
| 4,173,826 | A | 11/1979 | Leopoldi et al. |
| 4,179,806 | A | 12/1979 | Lieptz |

(Continued)

FOREIGN PATENT DOCUMENTS

| | | | |
|---|---|---|---|
| CN | 202699630 | U | 1/2013 |
| DE | 4238843 | A1 | 7/1993 |

(Continued)

OTHER PUBLICATIONS

"Amazon.com: Pill Splitter", Search Results Screen 1, Accessed on Nov. 11, 2019, 15 Pages.

(Continued)

*Primary Examiner* — Phong H Nguyen
(74) *Attorney, Agent, or Firm* — Goff IP Law PLLC; Jared S. Goff

(57) ABSTRACT

A pill can be positioned on a first housing of a pill splitter. A second housing of the splitter can be pushed downward onto the first housing. A second blade can be secured to the second housing, and the pushing of the second housing downward toward the closed position can split the pill by bringing the second blade toward a first blade with cutting edges of both blades cutting into the pill. Also, the second housing can be configured to slide in a linear direction to split the pill and form a closed pill container space. The pill splitter can include a platform that is configured to move to hide or expose one of the blades. The first housing may include a spring device integrally formed with a foundation and/or the platform, with the spring device biasing the platform relative to the foundation toward the hiding position.

20 Claims, 21 Drawing Sheets

(56) References Cited

U.S. PATENT DOCUMENTS

| | | | |
|---|---|---|---|
| 4,330,936 | A | 5/1982 | Swarth |
| 4,640,011 | A | 2/1987 | Gamble |
| 4,697,344 | A | 10/1987 | Leopoldi |
| 4,824,000 | A | 4/1989 | Baxter et al. |
| 5,038,475 | A | 8/1991 | Wolff |
| 5,178,337 | A | 1/1993 | Lupoli |
| 5,459,926 | A | 10/1995 | Perea |
| 5,944,243 | A | 8/1999 | Weinstein |
| 6,342,248 | B1 | 1/2002 | Miyabe et al. |
| 6,474,525 | B1 | 11/2002 | Reitano |
| D467,664 | S | 12/2002 | Chue |
| D468,023 | S | 12/2002 | Buckley et al. |
| 6,527,155 | B2 | 3/2003 | Buckley et al. |
| 6,637,685 | B1 | 10/2003 | Kruger |
| 6,644,528 | B1 | 11/2003 | Reitano |
| 6,813,832 | B2 | 11/2004 | Alexander |
| 6,966,509 | B2 | 11/2005 | Janzen |
| 7,243,826 | B2 | 7/2007 | Darst |
| 7,445,172 | B1 | 11/2008 | Bucknor |
| 7,458,300 | B2 | 12/2008 | Williams |
| 7,699,251 | B2 | 4/2010 | Frick |
| 7,828,181 | B1 | 11/2010 | Reitano |
| 8,590,164 | B2 | 11/2013 | Noble et al. |
| D713,540 | S | 9/2014 | Petrie et al. |
| 8,925,434 | B2 | 1/2015 | Omura et al. |
| D732,950 | S | 6/2015 | Young et al. |
| 9,827,165 | B1 | 11/2017 | Sundt |
| D809,153 | S | 1/2018 | Noble |
| 10,245,215 | B2 | 4/2019 | Triplett |
| 10,398,628 | B2 | 9/2019 | Raghuprasad |
| D933,847 | S | 10/2021 | Triplett |
| 2003/0010349 | A1 | 1/2003 | Rende |
| 2003/0019900 | A1 | 1/2003 | Dienst |
| 2005/0067452 | A1 | 3/2005 | Darst |
| 2006/0248730 | A1 | 11/2006 | Miller et al. |
| 2008/0011803 | A1 | 1/2008 | Petrie et al. |
| 2008/0011804 | A1 | 1/2008 | Petrie et al. |
| 2009/0064509 | A1 | 3/2009 | Farnworth et al. |
| 2009/0183373 | A1 | 7/2009 | Suhr |
| 2011/0289784 | A1 | 12/2011 | Jones |
| 2012/0060374 | A1 | 3/2012 | Noble et al. |
| 2013/0125722 | A1 | 5/2013 | Omura et al. |
| 2015/0209236 | A1 | 7/2015 | Patel |
| 2015/0257978 | A1 | 9/2015 | Smith |
| 2016/0367441 | A1 | 12/2016 | Martin |
| 2019/0060173 | A1 | 2/2019 | Raghuprasad |
| 2019/0224076 | A1 | 7/2019 | Radohl et al. |
| 2020/0060935 | A1 | 2/2020 | Alshear |
| 2020/0170885 | A1 | 6/2020 | Ahmed |
| 2020/0297583 | A1 | 9/2020 | Dang et al. |

FOREIGN PATENT DOCUMENTS

| | | | |
|---|---|---|---|
| DE | 20000294 | U1 | 5/2000 |
| DE | 202005018139 | U1 | 1/2006 |
| JP | 2000084049 | A | 3/2000 |

OTHER PUBLICATIONS

"Amazon.com: Pill Splitter", Search Results Screen 2, Accessed on Nov. 11, 2019, 13 Pages.

"Amazon.com: Pill Splitter", Search Results Screen 3, Accessed on Nov. 11, 2019, 14 Pages.

"Amazon.com: Pill Splitter", Search Results Screen 4, Accessed on Nov. 11, 2019, 13 Pages.

"Amazon.com: Pill Splitter", Search Results Screen 5, Accessed on Nov. 11, 2019, 13 Pages.

"Amazon.com: Pill Splitter", Search Results Screen 6, Accessed on Nov. 11, 2019, 14 Pages.

"Amazon.com: Pill Splitter", Search Results Screen 7, Accessed on Nov. 11, 2019, 8 Pages.

Amazon, "Diamerd Multiple Pill Cutter Crusher Splitter", first available May 25, 2020. (https://www.amazon.com/Diamerd-Multiple-Cutter-Crusher-Splitter/dp/B0894KMN2X) (Year: 2020).

Amazon, "The EQUADOSE Pill Cutter V2", first available Aug. 10, 2020. (https://www.amazon.com/dp/B08FKCJS76/) (Year: 2020).

Amazon, "The Equadose Pill Splitter", first available Mar. 3, 2015. (https://www.amazon.com/dp/BOOU84Q80K) (Year: 2015).

Amazon, "Worldlife Pill Case with Pill Cutter", first available Jun. 27, 2019. (https://www.amazon.com/Worldlife-Moisture-Proof-Medication-Splitter-Storage/dp/B07FN BDHCY) (Year: 2019).

Triplett, Tyson, Design U.S. Appl. No. 29/721,067, filed Jan. 17, 2020, 10 Pages.

Tripplett, Tyson, "Pill Splitter", U.S. Appl. No. 16/745,703, filed Jan. 17, 2020, 64 Pages.

PILL SPLITTER

RELATED APPLICATIONS

The present application is a divisional of U.S. application Ser. No. 16/745,703, filed Jan. 17, 2020, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

People have found it helpful to split or cut pills. For example, they may do this to reduce the dosage or to make a pill easier to swallow. Typical pill splitters have mechanisms to allow a user to manually press a single blade against the pill. Other pill splitters have used a pair of blades that a user can squeeze together to split the pill.

SUMMARY

Whatever the advantages of previous pill splitters, they have neither recognized the need for the features of the pill splitters described and claimed herein, nor the advantages produced by such features and pill splitters.

According to one aspect, a pill can be positioned on a portion of a first housing of a pill splitter, with the pill being positioned above a first blade of the pill splitter that is secured to the first housing. With the pill positioned on the portion of the first housing, a second housing of the pill splitter can be manually pushed downward toward a bottom of the first housing from an open position toward a closed position in which one or both of the second housing and the first housing comprise one or more surfaces that define a pill container space that contains the pill. A second blade can be secured to the second housing, and the pushing of the second housing downward toward the closed position can split the pill by bringing the second blade toward the first blade with both a cutting edge of the second blade and a cutting edge of the first blade cutting into the pill.

According to another aspect, a pill splitter can include a first housing and a second housing. The second housing can be configured to slide along the first housing in a linear direction between a closed position in which the second housing is slid onto the first housing with one or both of the second housing and the first housing defining a pill container space and an open position in which the second housing is fully detached from the first housing. The pill splitter can further include a first blade secured to the first housing, with the first blade being a different material than material of the first housing that is proximate to the first blade. A second blade can be secured to the second housing, with the second blade being a different material than material of the second housing that is proximate to the second blade. The pill splitter can be configured so that the linear sliding of the second housing toward the closed position brings the second blade toward the first blade.

According to yet another aspect, a pill splitter can include a blade and a first housing. The first housing can include a foundation to which the blade is secured. The first housing can also include a platform that is moveable relative to the blade, such that the platform is moveable between a hiding position in which the platform hides the blade and an exposing position in which the platform exposes the blade. The first housing can also include a spring device that is integrally formed with at least one of the foundation or the platform, with the spring device biasing the platform relative to the foundation toward the hiding position.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

Figure 1:
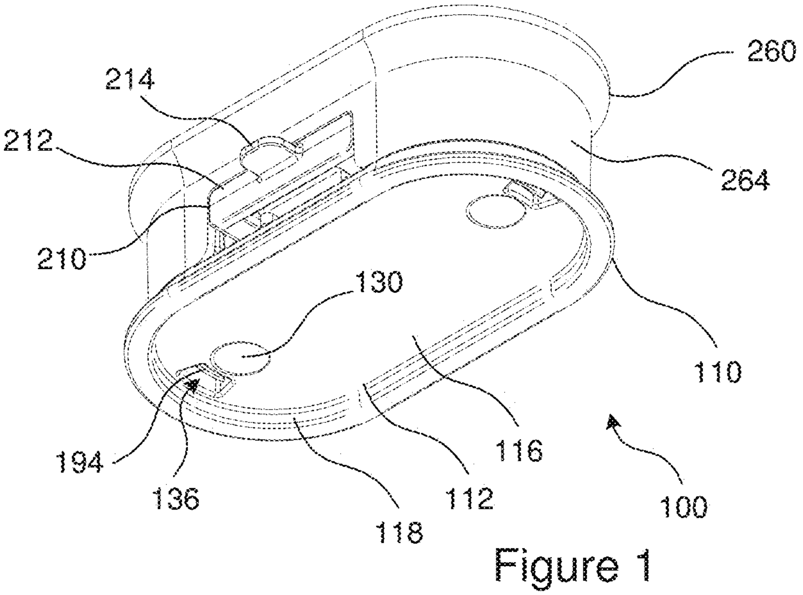
FIG. 1 is a perspective view of a first example of a pill splitter.
Figure 2:
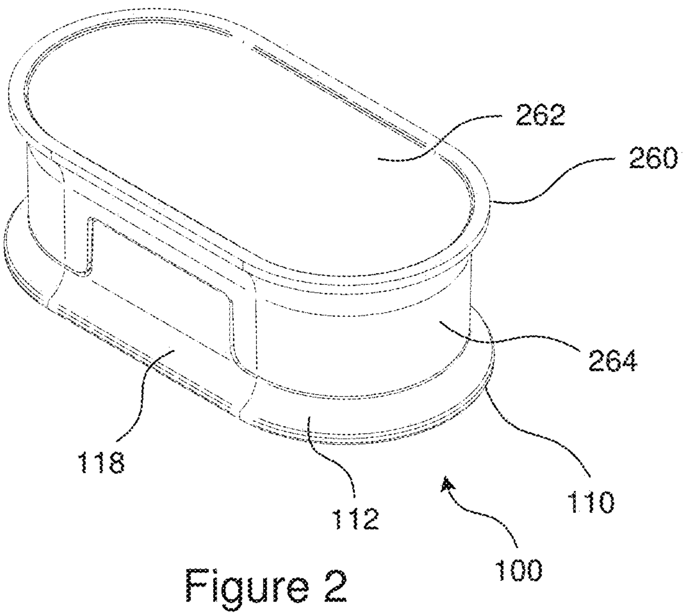
FIG. 2 is another perspective view of the pill splitter of FIG. 1.
Figure 3:
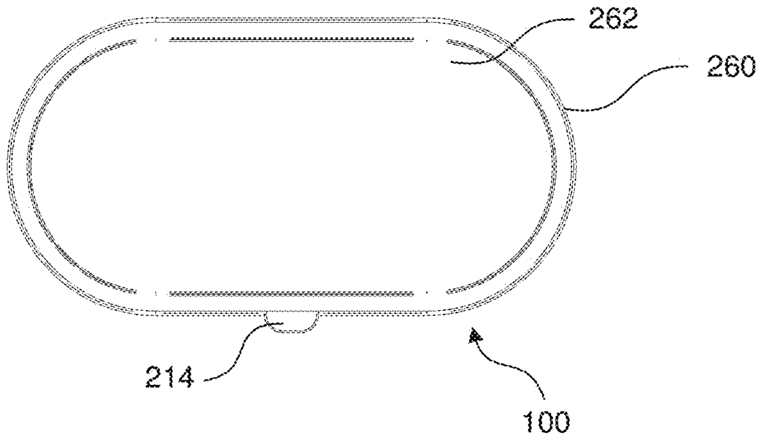
FIG. 3 is a top view of the pill splitter of FIG. 1.
Figure 4:
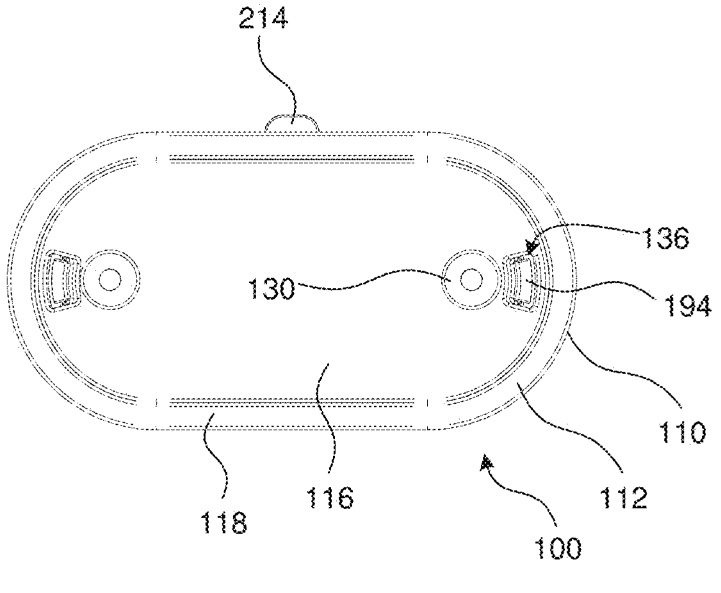
FIG. 4 is a bottom view of the pill splitter of FIG. 1.
Figure 5:
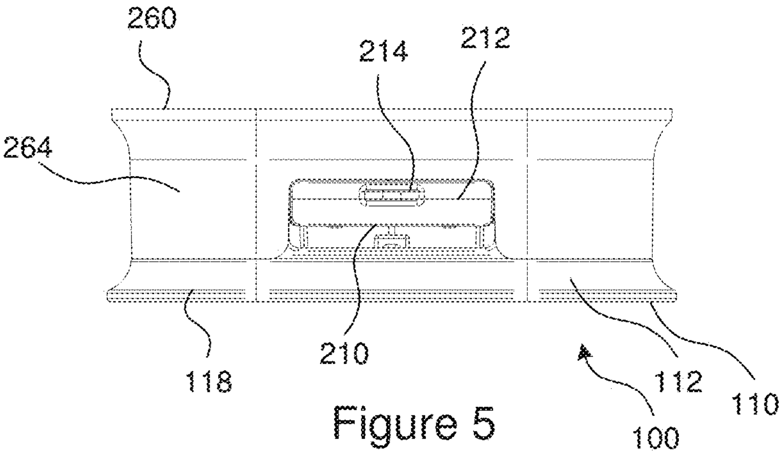
FIG. 5 is a front view of the pill splitter of FIG. 1.
Figure 6:
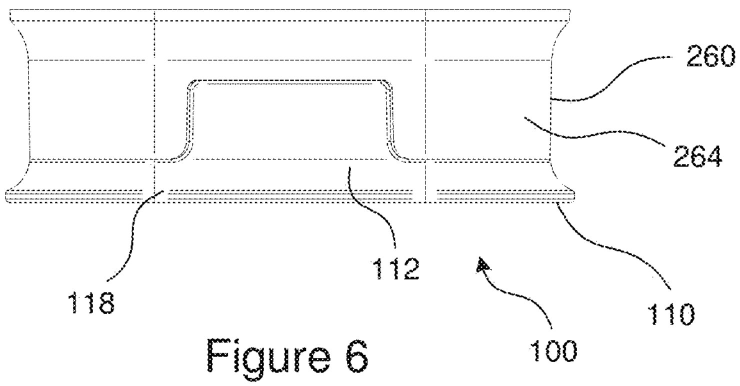
FIG. 6 is a rear view of the pill splitter of FIG. 1.
Figure 7:
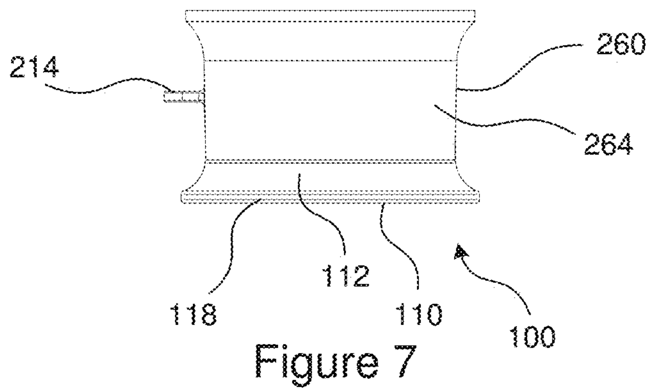
FIG. 7 is a left-side view of the pill splitter of FIG. 1.
Figure 8:
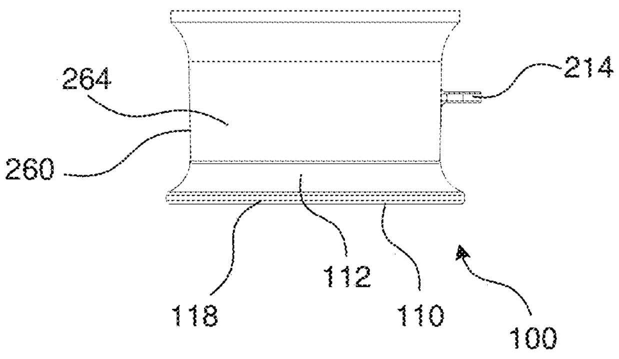
FIG. 8 is a right-side view of the pill splitter of FIG. 1.
Figure 9:
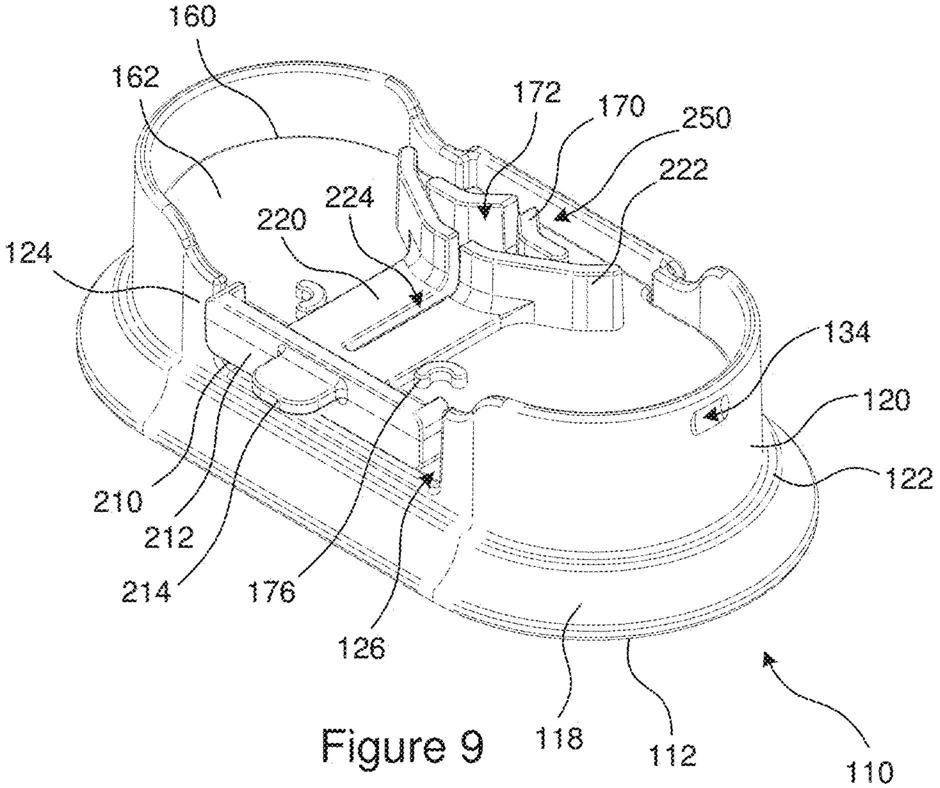
FIG. 9 is a perspective view of a first housing of the pill splitter of FIG. 1.

The description and drawings may refer to the same or similar features in different drawings with the same reference numbers. Also, in the drawings when multiple features in a figure are referenced by the same reference number in the text, only a single reference line and number are included in the figure.

DETAILED DESCRIPTION

Some previous pill splitters have been configured to allow a user to push downwardly on the on the pill splitter to cut the pill. Such pill splitters have typically included a pushing part that pushes against the pill from either the top or the bottom to push the pill against a cutting edge of a blade positioned opposite the pushing part, so that the single blade cuts into the pill and splits the pill. Other pill splitters have included blades on opposite sides of a pill where the pill splitters are configured for a user to squeeze the blades together (such as between a finger and thumb) with simple mechanisms (such as mechanisms like clippers with opposing blades) or to actuate the blades with complex mechanisms that are moved using handles or motors. It has been found that advantageous results can be achieved with a pill splitter that is configured for pill splitting to be effected by applying downward pressure, such as forcing the pill splitter against a table or other supporting surface, to press cutting edges of opposing blades against the pill. The combination of allowing for this downward pushing along with the use of multiple blades provides an easy-to-use pill cutter that does not need complex mechanisms for its operation. It has also been found that a pill splitter can include additional advantageous features, such as a fully removeable lid that can include an upper blade and can be configured to cut a pill as the lid is slid onto a device. For example, a second housing may be configured to slide onto a first housing in a linear direction to cut or split a pill. As used herein, a housing is a structure that supports one or more parts, such as supporting a blade. One or more housings may also form a case or enclosure for holding pills in some examples. As another example, a pill splitter can include a support or platform that can be configured to support a pill and to be moved to expose or hide a blade, wherein the platform can be biased toward a blade-hiding position with a spring device that is integrally formed with one or both of the platform or a foundation of the pill splitter. Besides these features, other features of the pill splitters and pill splitting methods discussed herein can produce advantageous results either alone or in combination with other features.

The subject matter defined in the appended claims is not necessarily limited to the benefits described herein. A particular implementation of the invention may provide all, some, or none of the benefits described herein. Also, although operations for the various techniques such as use of pill splitters are described herein in a particular, sequential order for the sake of presentation, it should be understood that this manner of description encompasses rearrangements in the order of operations, unless a particular ordering is required. For example, operations described sequentially may in some cases be rearranged or performed concurrently.

I. First Pill Splitter Example

A. First Pill Splitter Structure

Figure 10:
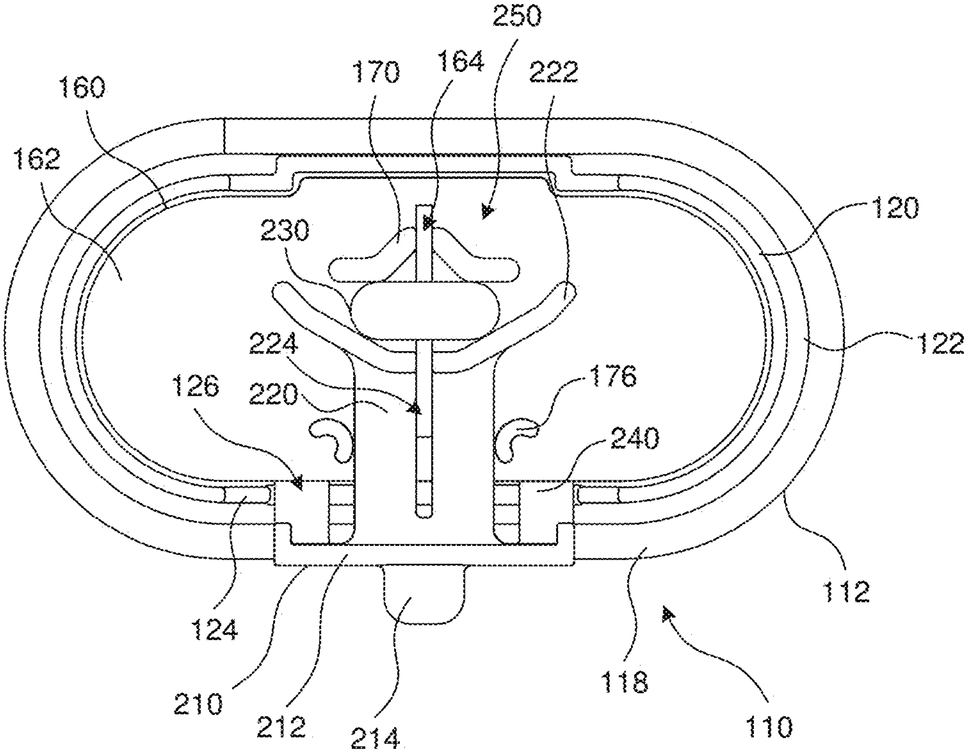
FIG. 10 is a top view of the first housing of FIG. 9, with a pill positioned in the pill splitter for splitting the pill.
Figure 11:
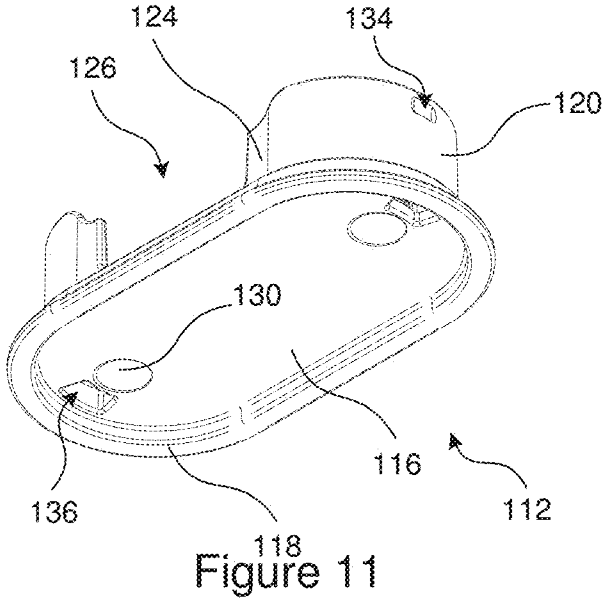
FIG. 11 is a perspective view of a foundation of the first housing of FIG. 9.
Figure 12:
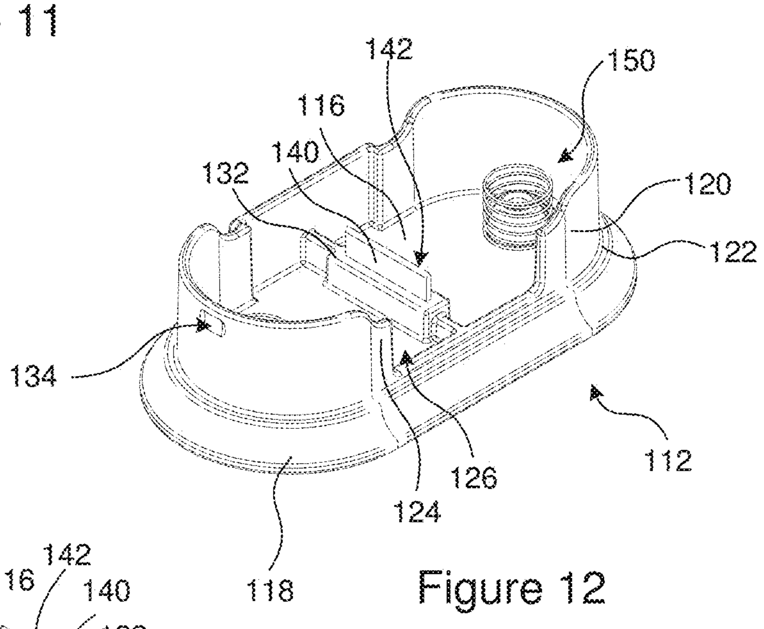
FIG. 12 is another perspective view of the foundation of FIG. 11, also showing a spring device and a first blade of the pill splitter.
Figure 13:
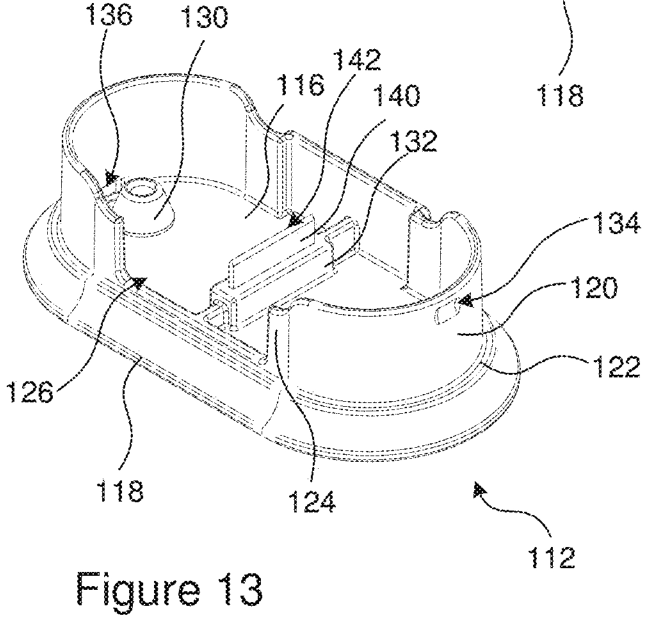
FIG. 13 is a perspective view like FIG. 12, except from a different perspective and with the spring device removed to reveal features of the foundation.
Figure 14:
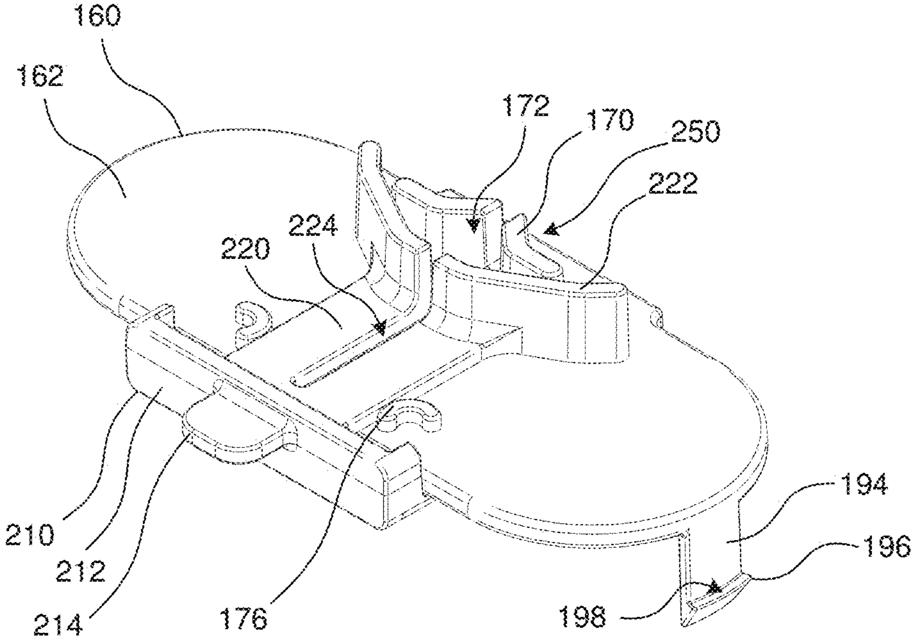
FIG. 14 is a perspective view of a platform and pill positioning device from the first housing of FIG. 9.

Referring now to FIGS. 1-23, a first pill splitter 100 will be discussed. The first pill splitter 100 can include a first housing 110. The first housing 110 can include a foundation 112, which can be configured to rest on a support surface 114 (see FIGS. 2-24). Referring to FIGS. 11-13, the foundation 112 can include a foundation floor 116, which can be a generally horizontally-extending oval shape with a generally rectangular central area and a pair of rounded (e.g., semi-circular) areas, with one such rounded area at each end. The foundation 112 can also include a stand 118, which can extend down and out from the periphery of the foundation floor 116, so that the foundation floor can be raised above the support surface 114 upon which the stand 118 is resting. Additionally, the stand 118 can help to stabilize the foundation 112.

The foundation 112 can also include a wall 120 extending up from a periphery of the foundation floor 116, with the wall 120 and the stand 118 each extending around the periphery of the foundation floor 116. An upper surface of the stand 118 can extend out from the base of the wall 120 to form a ledge 122 that faces upwardly and extends around the outside of the bottom of the wall 120. A front side 124 of the wall 120 can define an access cutout 126 that can extend downwardly from a top of the wall. Additionally, the foundation 112 can include a pair of spring positioners 130, with the spring positioners 130 being hollow truncated cones that narrow as they extend up from opposite ends of the foundation floor 116, with each spring positioner 130 extending up from one of the semi-circular areas of the foundation floor 116.

Between the spring positioners 130, a blade support 132 can extend from the front of the wall 120 of the foundation 112 to a rear of the wall 120 and can extend up from the foundation floor 116. For example, the blade support 132 can be protrusion such as a wall. The wall 120 can define a pair of lid engagement recesses 134 extending into an exterior surface of the wall 120 on opposite ends (left and right ends) of the wall 120, with the lid engagement recesses 134 being positioned beyond the spring positioners 130.

Additionally, an aperture 136 can extend downwardly into each of the left and right ends of the foundation floor 116 and can extend outwardly to each define a platform engaging surface 138 that faces downwardly.

A bottom portion of a first blade 140 can be seated within a slot in the blade support 132 so that the first blade 140 can be fixed and secured to the foundation 112. The first blade 140 can extend up from the blade support 132 and include a wedge that narrows to form a cutting edge 142, which can face upwardly and extend horizontally in a front-to-rear direction.

A spring device 150, which can be considered part of the first housing 110, can include a pair of springs, such as with one compression spring positioned around each of the spring positioners 130, with each spring being seated against the foundation floor 116 and extending upwardly above the spring positioner 130 upon which it is seated.

Referring to FIGS. 9-10 and 14-17, the first housing 110 can further include a support or platform 160 that is moveable relative to the foundation 112. The platform 160 can include a platform floor 162, which can be shaped similarly to the foundation floor 116, so that the platform floor 162 can slide in a linear vertical direction within the space defined by the wall 120 of the foundation 112. The platform floor 162 can define an elongated blade slot 164 extending therethrough, which can extend front-to-rear and can be positioned midway between the right and left ends of the platform floor 162. The platform 160 can also include a pair of fixed pill positioning walls 170, with one fixed pill positioning wall 170 extending up from the platform floor 162 on each side of the blade slot 164. The fixed pill positioning walls 170 can generally extend forward toward a front of the platform floor 162 as they extend out to the sides of the blade slot 164. Accordingly, as a pill is pushed rearward against the fixed pill positioning walls 170, the pill will tend to slide toward the center, so that the pill is centered over the blade slot 164. The forward-facing surfaces 172 of the fixed pill positioning walls 170 can be generally convex. Each forward-facing surface 172 can include a first section that angles forward and out from the blade slot 164 and a second section that extends to the left or right away from the blade slot 164 (such as where the second section can extend perpendicular to the blade slot 164).

The platform 160 can further include a pair of top stops 176, which can be positioned forward of the fixed pill positioning walls 170 on each side of the blade slot 164. Each top stop 176 can be a protrusion that extends up from the top surface of the platform floor 162. Additionally, the platform 160 can include a pair of bottom stops 178 that can also be positioned forward of the fixed pill positioning walls 170 on each side of the blade slot 164. The bottom stops 178 can be protrusions that extend down from the bottom surface of the platform floor 162. Between each bottom stop 178 and the blade slot 164, a guide ridge 182 can extend down from the bottom surface of the platform floor 162. Each guide ridge 182 can extend from a front end that is proximate to a front side of the platform floor 162 back toward the rear side of the platform floor 162, thus extending parallel to the blade slot 164. The platform floor 162 can also define a pair of recesses 186 extending up into the bottom of the platform floor 162.

The platform 160 can also include a pair of rings 190 extending down from left and right ends of the platform floor 162. The rings 190 can be sized and positioned so that the springs of the spring device 150 extend around the rings 190. Thus, the spring positioners 130 of the foundation 112 and the rings 190 of the platform 160 can cooperate to help keep the springs of the spring device 150 seated in place between the platform 160 and the foundation 112. The spring device 150 can provide an upward biasing force on the platform 160 relative to the foundation 112, thereby biasing the platform 160 toward a position in which the platform is raised to hide the first blade 140 in a hiding position. However, the spring device 150 can allow the platform 160 to descend to an exposing position wherein the first blade 140 is exposed when enough downward force is applied to the platform 160, relative to the foundation 112.

The platform 160 can also include platform fingers 194, which can descend from opposite left and right ends of the platform 160. The platform fingers 194 can each include a protrusion 196 near the bottom terminus of the platform finger 194 that extends outward and away from a center of the platform 160. Each protrusion 196 can include a foundation engaging surface 198 that faces upwardly and extends horizontally out from a body of the platform finger 194 and a sloped surface that extends in and down from a terminus of the foundation engaging surface 198. The foundation engaging surface 198 of each platform finger 194 can abut a platform engaging surface 138 of the foundation 112 in the blade hiding position, which can oppose the force of the spring device 150 and inhibit a complete separation of the platform 160 from the foundation 112. However, the platform 160 can be allowed to move downward from the blade hiding position, with the platform fingers 194 sliding within the apertures 136 and the platform 160 sliding up and down within the wall 120 of the foundation 112.

The first housing 110 can also include a pill positioner 210, which can be mounted on the platform 160 and move up and down with the platform 160 but can move horizontally relative to the platform 160. Specifically, the pill positioner 210 can include a front face 212, which can be a generally rectangular wall that is sized to fit at least partially into the access cutout 126 of the foundation 112. The pill positioner 210 can also include a tab 214 extending forward from the front face 212 so that the tab 214 can be grasped as a handle for the pill positioner 210. Additionally, the pill positioner 210 can include a top plate 220, which can extend rearward from the front face 212 along the top surface of the platform floor 162. Moveable pill positioning walls 222 can be fixed to the rear end of the top plate 220, and can extend up from the top plate as well as extending rearward as they extend outward from a blade slot 224 that can extend front-to-rear along the top plate 220. The blade slot 224 can extend through the top plate 220 and between the moveable pill positioning walls 222. Also, the blade slot 224 can align with the blade slot 164 of the platform 160, allowing the first blade 140 to extend through the blade slot 224 and the blade slot 164 when the platform 160 is pushed down to expose the first blade 140. The curvature of the moveable pill positioning walls 222 and the fixed pill positioning walls 170 can be seen in FIG. 10, which illustrates the fixed pill positioning walls 170 and the pill positioner 210 cooperating to center a pill 230 over the blade slot 224, the blade slot 164, and the first blade 140. Thus, the fixed pill positioning walls 170 and the pill positioner 210 together form a pill positioning device 250, which can be a pill positioning mechanism with the pill positioner 210 moving relative to the fixed pill positioning walls 170 to initially position and to hold pills of different shapes and sizes in a centered position as illustrated in FIG. 10.

As the pill positioner 210 slides forward and rearward along the platform 160, the front face 212 of the platform can abut the front edge of the platform 160 to prevent the pill positioner 210 from sliding too far forward (or such forward movement may be stopped by the moveable pill positioning walls 222 abutting the fixed pill positioning walls 170 or a pill 230 positioned between the walls). Rearward movement of the pill positioner 210 can be inhibited when the moveable pill positioning walls 222 abut the top stops 176 of the platform 160.

Figure 15:
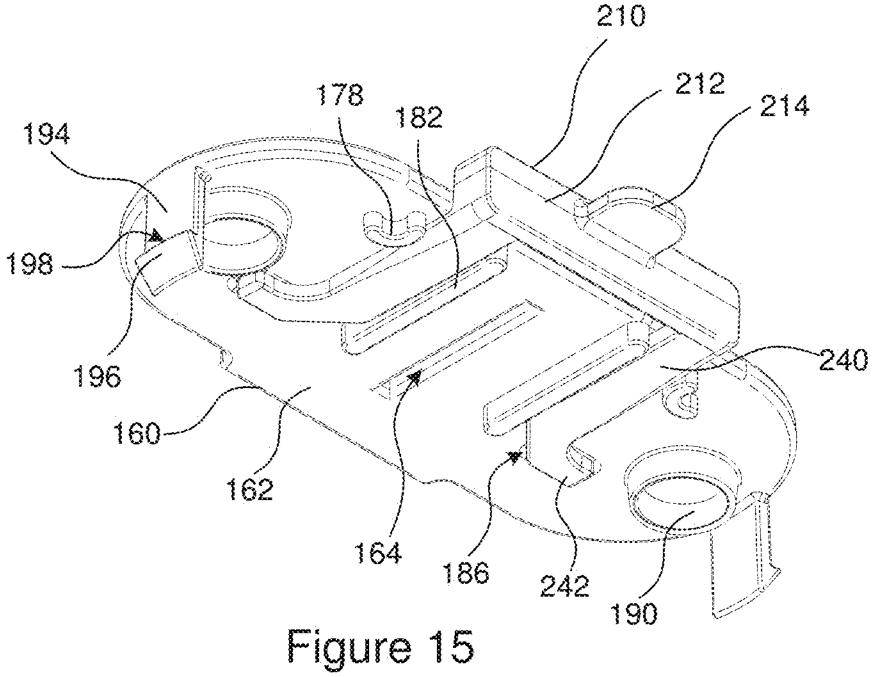
FIG. 15 is another perspective view of the platform and pill positioning device from the first housing of FIG. 9.
Figure 16:
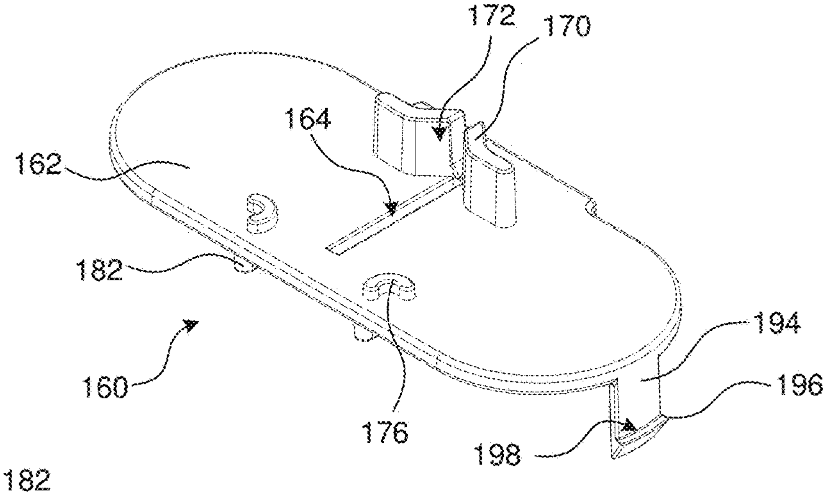
FIG. 16 is a perspective view of the platform of FIGS. 14-15.
Figure 17:
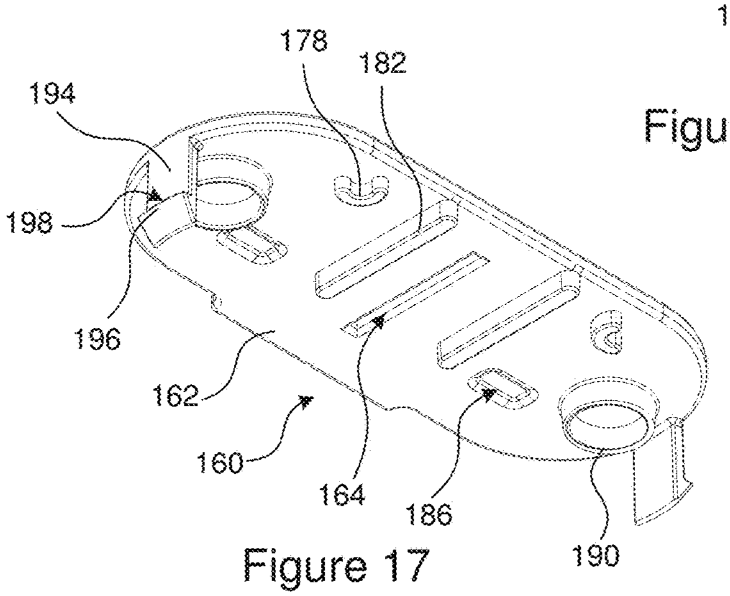
FIG. 17 is another perspective view of the platform of FIGS. 14-15.
Figure 18:
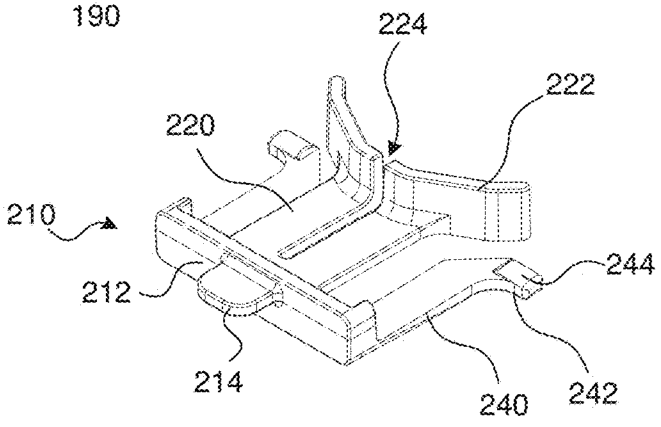
FIG. 18 is a perspective view of a pill positioner from the pill positioning device of FIGS. 14-15.
Figure 19:
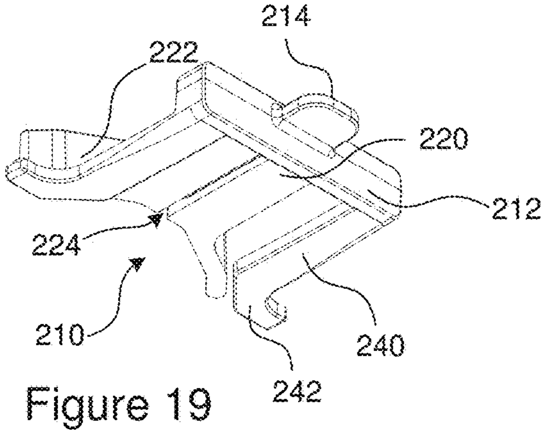
FIG. 19 is another perspective view of the pill positioner from the pill positioning device of FIGS. 14-15.

The pill positioner 210 can also include a pair of fingers 240 that can extend rearward from left and right ends of the front face 212 along the bottom surface of the platform 160 (see FIG. 15). The fingers 240 can extend rearward along outwardly-facing surfaces of the guide ridges 182, with the guide ridges assisting in orienting the pill positioner 210. The fingers 240 can curve out away from each other at their fingertips 242, which can each include a protrusion 244 that extends upwardly. When the pill positioner 210 is in its most rearward position as illustrated in FIG. 15, the protrusions 244 can extend into the recesses 186 in the bottom of the platform 160 to help keep the pill positioner 210 in this fully inserted position, such as when the pill positioner 210 is not in use.

The tab 214 can be grasped to pull the pill positioner 210 forward to an extended position, which can allow a pill to be placed between the moveable pill positioning walls 222 and the fixed pill positioning walls 170. The fingertips 242 can abut the bottom stops 178 of the platform 160 while the moveable pill positioning walls 222 abut the top stops 176 to inhibit further extending movement of the pill positioner 210.

Figure 20:
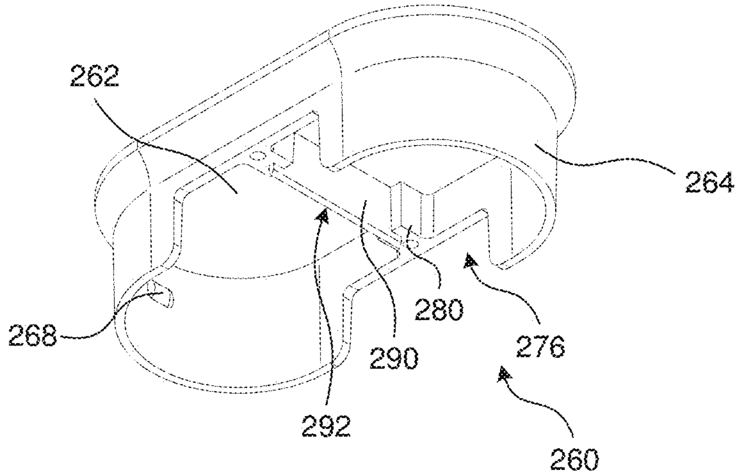
FIG. 20 is a perspective view of a second housing of the pill splitter of FIG. 1, with a blade secured to the second housing.
Figure 21:
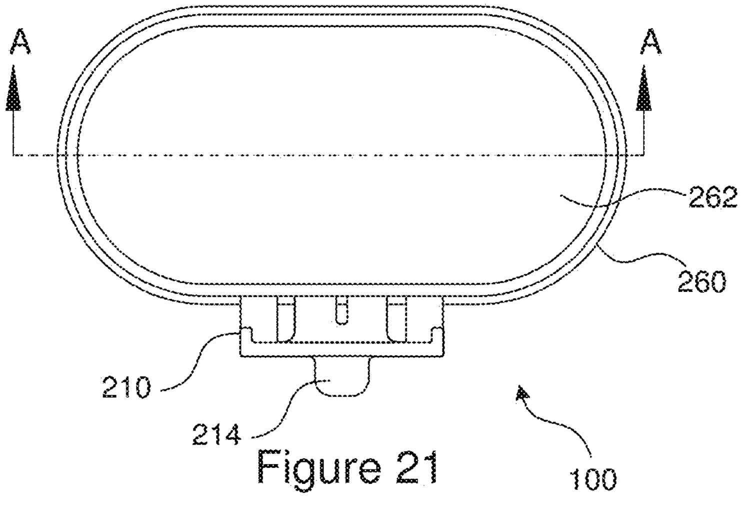
FIG. 21 is a top view like FIG. 3, except with a moveable pill positioner pulled out so that the pill positioner does not block other features in a view along line A-A.

Referring now to FIG. 20 and to FIGS. 1-8 and 21-24, a second housing 260 will be discussed. The second housing 260 can act as a lid for the first pill splitter 100 and can also act as a blade holder as will be discussed more below. The second housing can include a ceiling 262 that can be shaped similarly to the foundation floor 116 and the platform floor 162. The second housing 260 can also include a wall 264 that extends down from a periphery of the ceiling 262, with the wall 264 being sized and shaped so that the wall 264 of the second housing 260 can extend along the outside of the wall 120 of the foundation 112.

Inner surfaces of the left and right ends of the wall 264 can include protrusions 268 that can be sized and positioned to extend into the lid engagement recesses 134 of the foundation 112 when the second housing 260 is placed down over the first housing 110. In this closed position, a lower edge of the wall 264 of the second housing 260 can rest on the ledge 122 of the foundation 112. Also in this closed position, the second housing 260 and the first housing 110 can cooperate to define a pill container space 270, which can be a fully enclosed space with the first pill splitter 100, although in some embodiments the container space may not be fully enclosed. In an open position, the second housing 260 can be fully removed from the first housing, although in other embodiments a second housing may be connected to a first housing, such as with a hinge.

The wall 264 of the second housing 260 can define upwardly-extending cutouts 276 that can align with the access cutout 126 of the foundation 112 when the pill splitter is in the closed position, allowing for access for the pill positioner 210. The second housing 260 can also include a blade support 280, which can extend front-to-rear between front and rear portions of the wall 264. The blade support 280 can also extend down from a bottom of the ceiling 262. A second blade 290 can be seated in the blade support 280 and can extend downwardly therefrom and slope inwardly to a cutting edge 292 that can face downwardly. The second blade 290 can be positioned above the first blade 140 as the wall 264 of the second housing and the wall 120 of the first housing guide the second blade 290 downwardly toward the first blade 140. The first blade 140 and the second blade 290 can also be aligned in a plane, as can their cutting edges. As the second housing 260 slides down onto the first housing 110, the cutting edge 292 of the second blade 290 can remain aligned with and move toward the cutting edge 142 of the first blade 140.

B. First Pill Splitter Use

Figure 22:
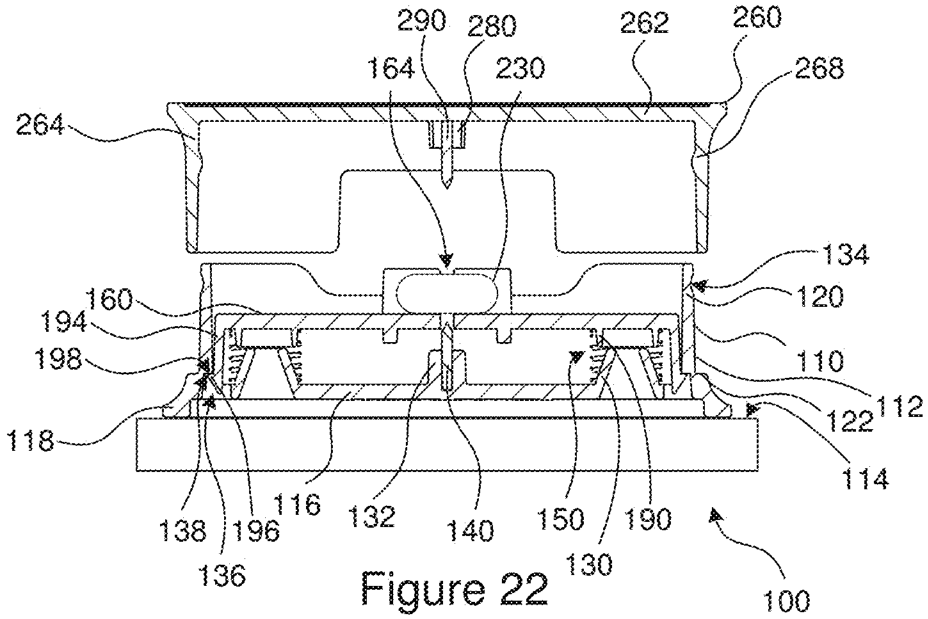
FIG. 22 is a sectional view taken along line A-A of FIG. 21, with a pill positioned for being split, and with the second housing fully removed from the first housing of the pill splitter.
Figure 23:
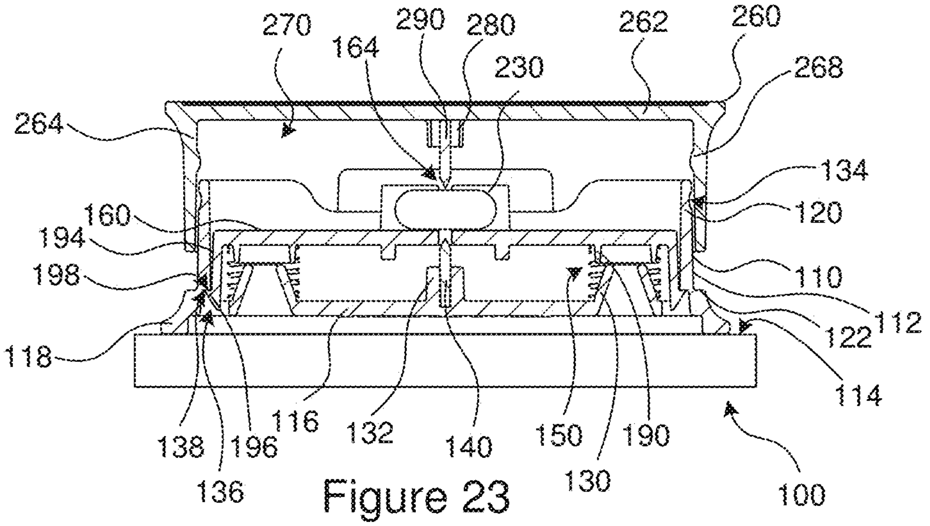
FIG. 23 is a sectional view like FIG. 22, except with the second housing being slid onto the first housing so that a blade secured to the second housing contacts the pill.
Figure 24:
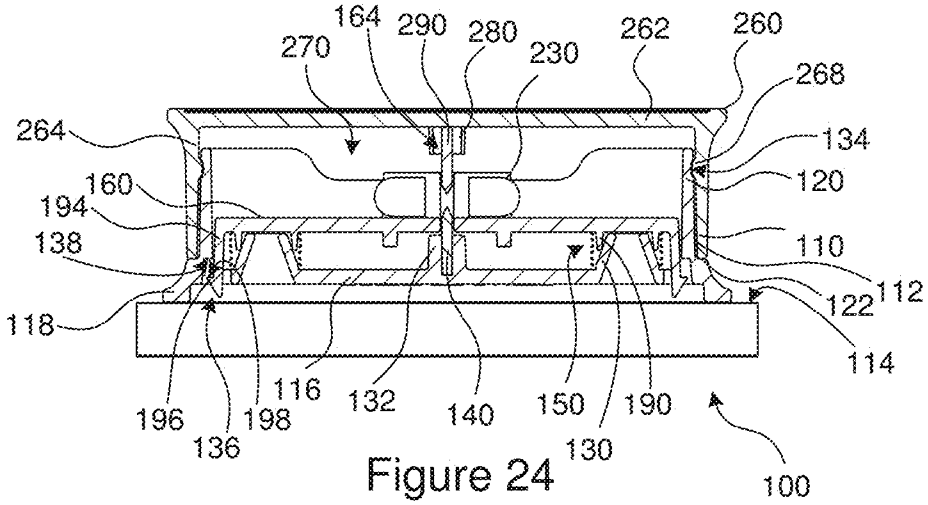
FIG. 24 is a sectional view like FIG. 23, except with the second housing being further slid onto the first housing so that the blades secured to the first and second housings have cut into the pill, with the pill being split.
Figure 25:
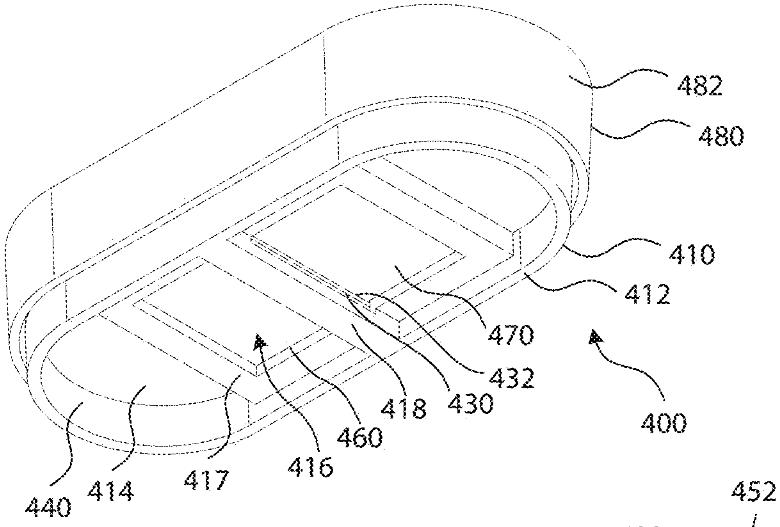
FIG. 25 is a perspective view of a second example of a pill splitter.
Figure 26:
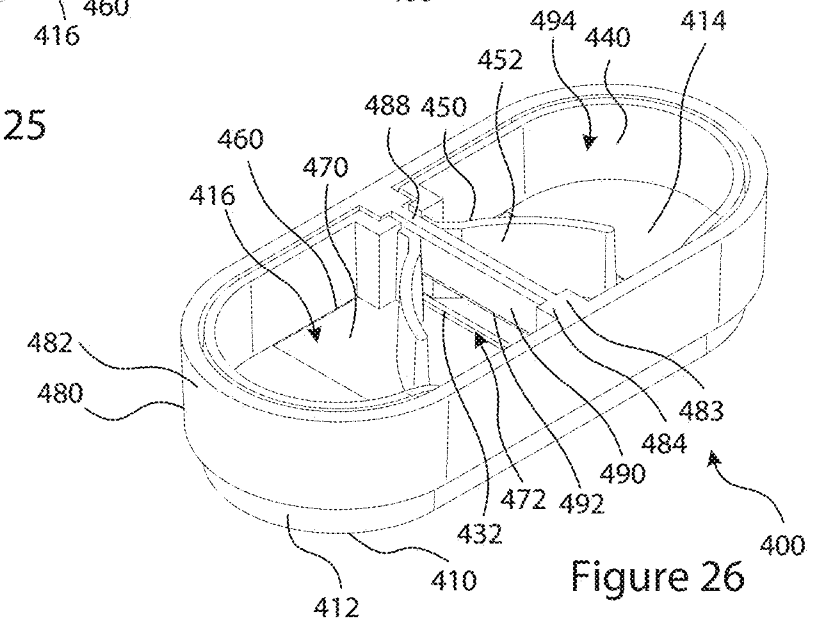
FIG. 26 is another perspective view of the pill splitter of FIG. 25.
Figure 27:
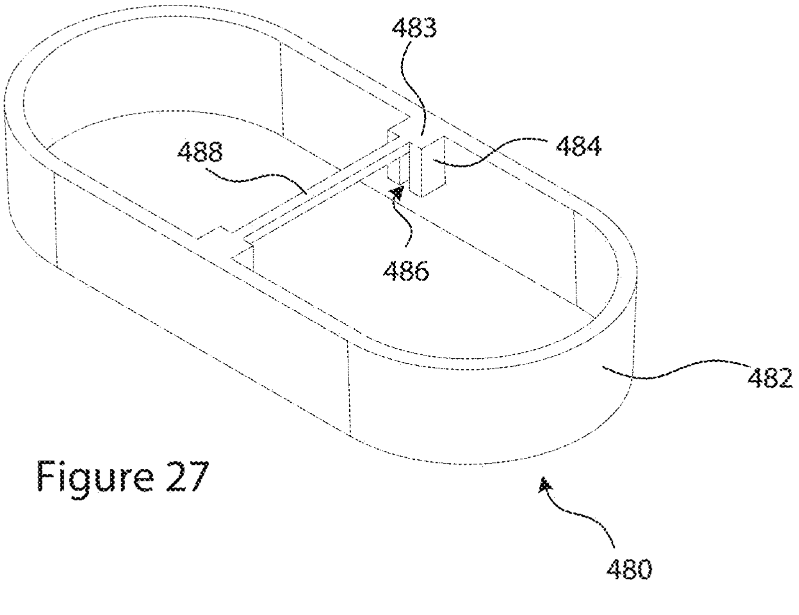
FIG. 27 is a perspective view of a second housing of the pill splitter of FIG. 25.
Figure 28:
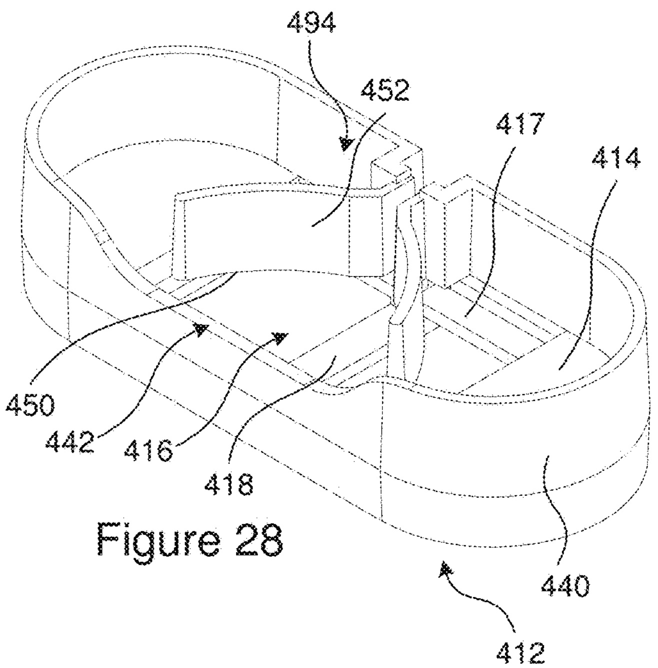
FIG. 28 is a perspective view of a first housing of the pill splitter of FIG. 25.
Figure 29:
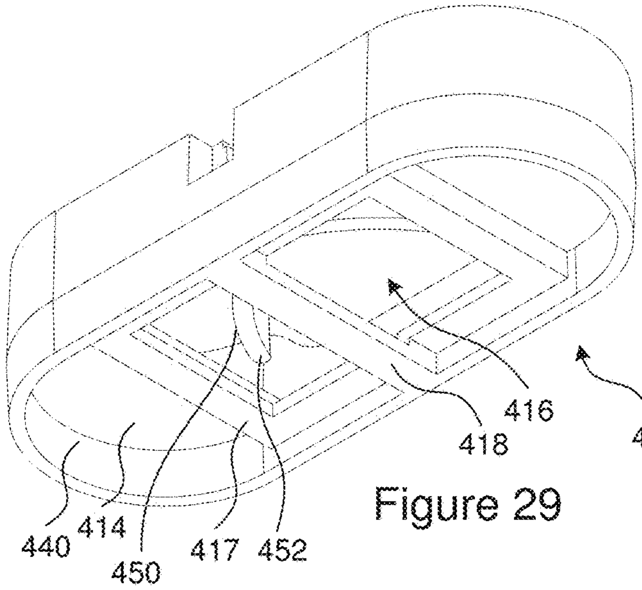
FIG. 29 is another perspective view of the first housing of FIG. 28.
Figure 30:
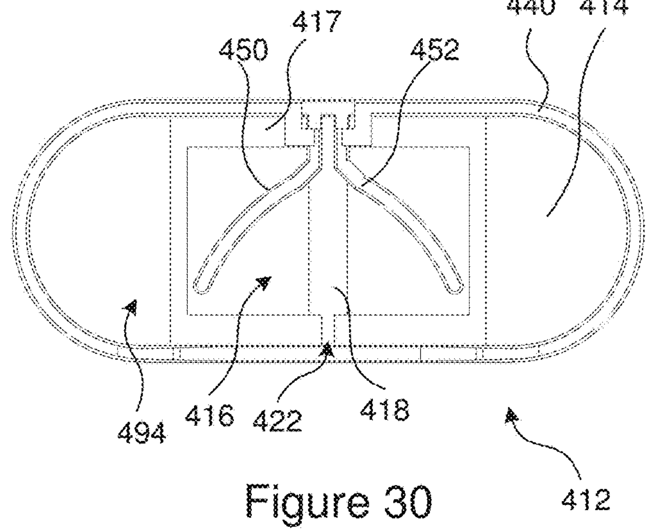
FIG. 30 is a top view of the first housing of FIG. 28.
Figure 31:
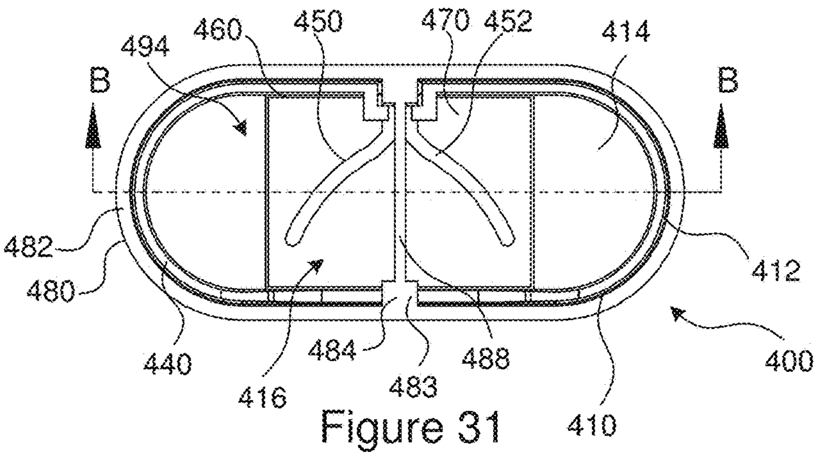
FIG. 31 is a top view of the pill splitter of FIG. 25.
Figure 32:
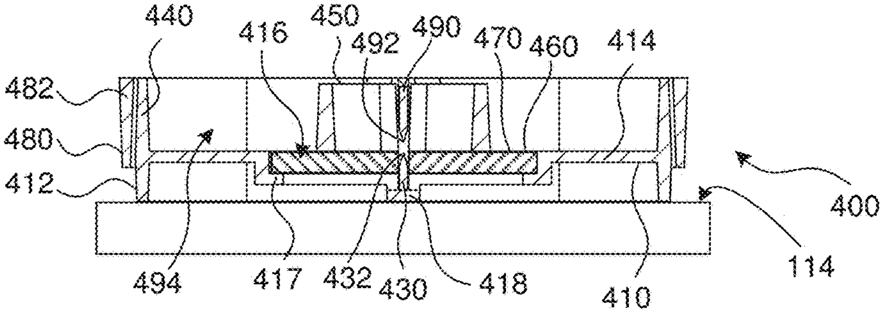
FIG. 32 is a sectional view taken along line B-B of FIG. 31, showing the pill splitter with the blades in a closed position.

Use of the first pill splitter 100 will now be discussed. Referring now to FIGS. 22-24, in use the pill 230 can be positioned on the platform 160 over the first blade 140 with the foundation 112 positioned on the support surface 114. The pill positioning device 250 can assist in positioning the pill 230, such as by holding the pill 230 in a set position in the first housing 110 during the pushing of the second housing 260 toward the closed position. For example, the pill 230 may be placed against the fixed pill positioning walls 170, and the pill positioner 210 can be slid rearward to sandwich the pill 230 between the fixed pill positioning walls 170 and the moveable pill positioning walls 222, as illustrated in FIG. 10. The pill positioner 210 can remain in this position, however for purposes of illustration, FIGS.

21-24 are shown with the pill positioner 210 being in its extended position during pill splitting (so that the pill positioner 210 does not block the view of the pill 230).

For splitting the pill 230, as illustrated in FIG. 22, the second housing 260 can be slid downward onto the first housing 110 until the second blade 290 contacts a top surface of the pill 230, as illustrated in FIG. 23. A user can continue to push down on the second housing 260, which can push the second blade 290 against the pill 230, with the pill 230 in turn pushing down on the platform 160 until the pill 230 contacts the first blade 140 (the exposed position, or blade-exposing position of the platform 160). Continued pushing down on the second housing 260 can cause the first blade 140 to cut into a bottom surface of the pill 230 and can cause the second blade 290 to cut into a top surface of the pill 230, and continued force can cause the pill 230 to spilt as illustrated in FIG. 24. With the pill 230 split, the spring device 150 can push the platform 160 back up to the hiding position, where the platform 160 hides the first blade 140.

Accordingly, the first pill splitter 100 can allow a user to split a pill by applying a downward force, rather than needing to squeeze the pill splitter. This can allow for easier pill splitting for many users. Additionally, allowing for this type of splitting with two blades cutting into the pill can make pill splitting even easier for a user, and can allow for a precise cut as the pill splits between the two blades. Accordingly, the first pill splitter 100 can provide substantial benefits, and additional features of the pill splitter can provide benefits alone, in combination with this overall downward-pushing two-blade feature, and/or in combination with other advantageous features discussed herein.

The first pill splitter 100 can also work as a pill container to hold pills in the pill container space 270, and the pill container space 270 can also contain parts of the pill during and after pill splitting.

In addition to the beneficial functional features of the first pill splitter 100, the first pill splitter 100 and the other pill splitters discussed herein provide aesthetically pleasing ornamental features, as can be seen in the accompanying figures.

C. First Pill Splitter Manufacturing and Materials

The parts of the pill splitter can be made of any materials that are sufficiently strong, hard, and durable for the functions and structure discussed herein. Also, different parts may be made with different materials that have different properties, although some parts may be made with the same materials. As an example, most of the parts of the first pill splitter 100 can be polymer parts that can be molded and/or formed in some other manner, such as additive (e.g., 3D printing) and/or subtractive (e.g., milling and/or drilling) manufacturing techniques. The first blade 140 and the second blade 290 may be the same as each other and may be formed of the same materials such as metal (e.g., steel) that is suitable for cutting blades. The springs may be made of spring metal, such as spring steel. Accordingly, the first blade 140 and the second blade 290 may each be made of materials that are stronger and harder than materials proximate to those blades, including materials of the blade supports of the first and second housings. Such strength and hardness values may be tested using standard techniques, such as tensile strength tests and Rockwell surface hardness tests.

In assembling the pill splitter, the first blade 140 and the second blade 290 may each be inserted into the corresponding blade support and may be held in place with a force fit and/or in some other way such as with an adhesive. Alternatively, the blades may be positioned in the molds when the second housing and the foundation are molded, so that the molding may assist in holding the blades in place. Additionally, the blades may include holes extending therethrough so that portions of the blade support can extend through the holes in the blades to secure the blades in place.

The pill positioner 210 can be slid onto the platform 160, which can include biasing the fingers 240 and/or the top plate 220 away from each other so that the fingertips 242 and the moveable pill positioning walls can slide past the bottom stops 178 and the top stops 176.

Additionally, the springs of the spring device 150 can be seated on the spring positioners of the foundation 112, and the platform 160 can be slid down within the wall 120 of the foundation 112. The sloped surfaces of the protrusion 196 of the platform fingers 194 can bias the platform fingers 194 inward as the platform 160 descends, until the protrusions reach the apertures 136, which allow the ends of the platform fingers 194 to spring outward with the protrusions being positioned below the platform engaging surfaces 138.

II. Second Pill Splitter Example

A. Second Pill Splitter Structure

A second pill splitter 400 is illustrated in FIGS. 25-34. The second pill splitter 400 can include a first housing 410, which can include a foundation 412. The foundation 412 can generally be shaped similarly to the foundation discussed above in the first pill splitter. The foundation 412 can include a pair of floor portions 414 that can be generally semi-rounded (e.g., semi-circular) raised portions at left and right ends of the foundation 412. The floor portions 414 can define a rectangular space 416 between them. Support ledges 417 can extend around a periphery of the rectangular space 416, and a central support 418 can extend from front to rear through a central area of the rectangular space 416 below the support ledges 417. The support ledges 417 can define blade support slots 422 that can be positioned at the front and rear of the support ledges and can be aligned with the central support 418. A first blade 430 can have front and rear ends that are seated in the blade support slots 422, with a bottom of the first blade 430 extending along the central support 418 between the blade support slots 422. The first blade 430 can extend up to terminate in a cutting edge 432 that faces upwardly and extends horizontally from front to rear. The cutting edge 432 of the first blade 430 can be positioned below a level of top surfaces of the floor portions 414 but above top surfaces of the support ledges 417.

The first housing 410 can also include a wall 440 that extends up and down from a periphery of the floor portions 414 and the support ledges 417. The wall 440 can include a downwardly-extending access cutout 442 therein. The foundation 412 can also include a stationary pill positioning device 450, which can include a pair of fixed pill positioning walls 452 that extend forward from a central portion of the rear of the wall 440, centered over the first blade 430. From that position, the fixed pill positioning walls 452 can extend forward and out. Accordingly, a pill can be centered over the first blade 430 by pushing the pill rearward against the fixed pill positioning walls 452.

The first housing 410 can also include a platform 460, which can be moveable and can include a pair of mats 470, which can be elastically compressible, such as mats made of an elastic material, such as an elastomeric material. However, some examples may have a single mat with a blade access slot formed therein and aligned with the first blade. The mats 470 can be positioned on the support ledges 417, with the first blade 430 being positioned in a gap 472 between the mats 470. Accordingly, the mats 470 can move downward and upward adjacent to the first blade 430 without the first blade 430 interfering with movement of the mats 470. The mats 470 may be secured to the support ledges 417, such as with an adhesive material. Thus, a central portion of the mats 470 adjacent to a central portion of the first blade 430 can move down to expose the first blade 430, with the natural elastic properties of the mats 470 biasing the central portion back up to a flat position that hides the first blade 430. Accordingly, the mats 470 can act as both a spring device and a moving platform 460.

In some different examples elastic mats may be seated so that their bottom surfaces are fixed, while allowing the top surfaces to depress. Such movement can be considered movement of a pill-supporting platform, as with the other platform movements discussed herein.

The second pill splitter 400 can also include a second housing 480, which can include a wall 482 that can be oriented vertically and can continuously extend around a wall of the foundation 412. The second housing 480 can also include a blade support 483, which can include a pair of protrusions 484, with one protrusion 484 extending forward from a central upper portion of a rear side of the wall 482 and another protrusion 484 extending rearward from a central upper portion of a front side of the wall 482. Each of the protrusions 484 can define a blade support slot 486 that can open downwardly. Additionally, the blade support 483 can include a brace 488 that extends between upper portions of the protrusions 484. A second blade 490 can be seated in the blade support slots 486 of the protrusions 484, and a top of the second blade 490 can extend along a bottom surface of the brace 488. The second blade 490 can extend down to a cutting edge 492. The second blade 490 and the first blade 430 can each be secured in place in one or more ways, such as the ways of securing blades described above with respect to the first pill splitter. With the second housing 480 positioned on the first housing 410, the second blade 490 can be positioned above and coplanar with the first blade 430.

Rather than having a ceiling, the second housing 480 can be open on its top side. This has an advantage of allowing a user to have visual and/or tactile access to a pill container space 494 while the second housing 480 is positioned on the first housing 410, although the pill container space 494 is not fully enclosed. Alternatively, the second housing may include a ceiling to fully enclose the pill container space. Also, one or more parts of the pill splitters in one or more of the embodiments discussed herein may be clear to allow a user to see the interior of the pill container space, even if the pill container space is fully enclosed.

B. Second Pill Splitter Use

Use of the second pill splitter 400 will now be discussed with reference to FIGS. 31-34. In use, a pill 496 can be positioned on the platform 460 over the first blade 430 with the foundation 412 positioned on the support surface 114. The stationary pill positioning device 450 can assist in positioning the pill 496. For example, the pill 496 may be placed against the fixed pill positioning walls 452.

Figure 33:
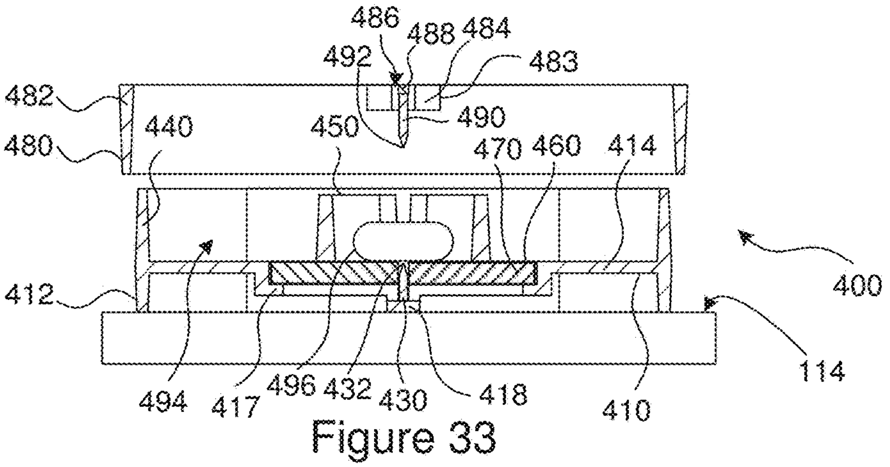
FIG. 33 is a sectional view like FIG. 32, except in an open position and further illustrating a pill being supported in the pill splitter.
Figure 34:
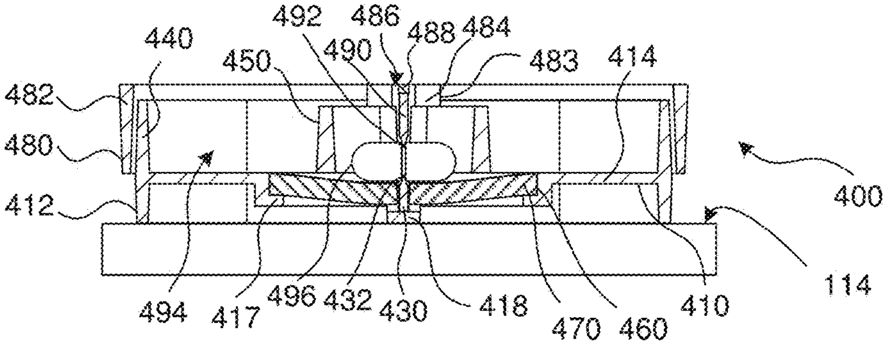
FIG. 34 is a sectional view like FIG. 33, except in a closed position, illustrating the pill being split and the resilient platform (e.g., elastomeric mats) being depressed to expose the second blade so that the first and second blades cut into the pill.

For splitting the pill 496, as illustrated in FIGS. 33-34 the second housing 480 can be slid downward onto the first housing 410 until the second blade 490 contacts a top surface of the pill 496. A user can continue to push down on the second housing 480, which can push the second blade 490 against the pill 496, with the pill 496 in turn pushing down on the mats 470 of the platform 460 until the pill 496 contacts the first blade 430 (the exposed position, or blade-exposing position of the platform 460). Continued pushing down on the second housing 480 can cause the first blade 430 to cut into a bottom surface of the pill 496 and can cause the second blade 490 to cut into a top surface of the pill 496, and continued force can cause the pill 496 to split as illustrated in FIG. 34. With the pill 496 split, the elastic properties of the mats 470 can push the platform 460 back up to the hiding position, where the mats 470 of the platform 460 hide the first blade 430.

Accordingly, as with the first pill splitter 100, the second pill splitter 400 can allow a user to split a pill by applying a downward force, rather than needing to squeeze the pill splitter. This can allow for easier pill splitting for many users. Additionally, allowing for this type of splitting with two blades cutting into the pill can make pill splitting even easier for a user, and can allow for a precise cut as the pill splits between the two blades. Accordingly, the second pill splitter 400 can provide substantial benefits, and additional features of the pill splitter can provide benefits alone, in combination with this overall downward-pushing two-blade feature, and/or in combination with other advantageous features discussed herein.

The second pill splitter 400 can also work as a pill container to hold pills in the pill container space 494, and the pill container space 494 can also contain parts of the pill during pill splitting, although the pill container space 494 may not be fully enclosed.

C. Second Pill Splitter Manufacturing and Materials

Figure 35:
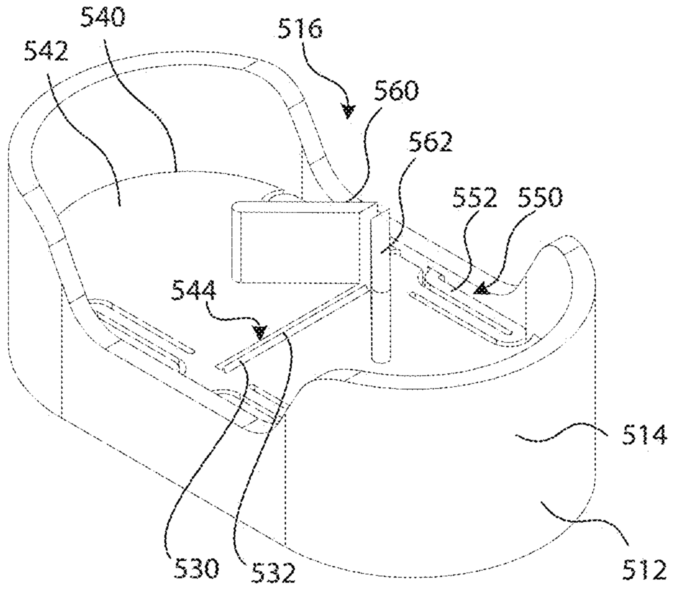
FIG. 35 is a perspective view of a first housing of a third example of a pill splitter.

The second pill splitter 400 can be made with materials and manufacturing techniques like those discussed above for the first pill splitter 100. Additionally, the mats 470 may be made of materials with elastomeric properties that allow the mats to be depressed as illustrated in FIG. 34, and to push back up to their initial flat shape as illustrated in FIG. 35. For example, the mats 470 may be made with rubber or rubber-like materials. During assembly, the mats may be positioned as illustrated in the figures, and may be secured in place, such as with adhesives.

III. Third Pill Splitter Example

A. Third Pill Splitter Structure

Referring now to FIGS. 35-39, a third example of a third pill splitter 500 will be discussed. The third pill splitter 500 can include a first housing 510, which can be formed as a single unitary part, such as with a molding technique. The first housing 510 can include a foundation 512, which can include a wall 514 oriented vertically and extending around the first housing 510 in a similar shape to the respective walls of the first housings of the first pill splitter 100 and the second pill splitter 400 discussed above. Specifically, the wall 514 can include straight front and rear sections and rounded left and right end portions to form a continuous wall. The wall 514 can also define downwardly-extending front and rear access cutouts 516. The foundation 512 can further include a blade support 518 that can extend between a lower central portion of the front section of the wall 514 to a lower central portion of the rear section of the wall 514. The blade support 518 can define an upwardly-opening slot therein, which can receive a bottom portion of a first blade 530, with the first blade 530 extending up from the blade support 518 to end in a cutting edge 532 that faces upwardly, with the first blade 530 and cutting edge 532 extending in a front-to-rear direction.

The first housing 510 can further include a platform 540 that is moveable relative to the foundation 512, with a platform floor 542 of the platform 540 extending horizontally within the wall 514 of the foundation 512. The platform 540 can be shaped so that a periphery of the platform 540 matches and is positioned inside an inner face of the wall 514, with a gap being defined between the wall 514 and the platform 540. The platform 540 can define a blade access slot 544 therein, which can extend front-to-rear above the cutting edge 532 of the first blade 530, allowing an upper portion of the first blade 530 to be exposed through the blade access slot 544 when the platform floor 542 descends below the cutting edge 532 of the first blade 530.

Figure 36:
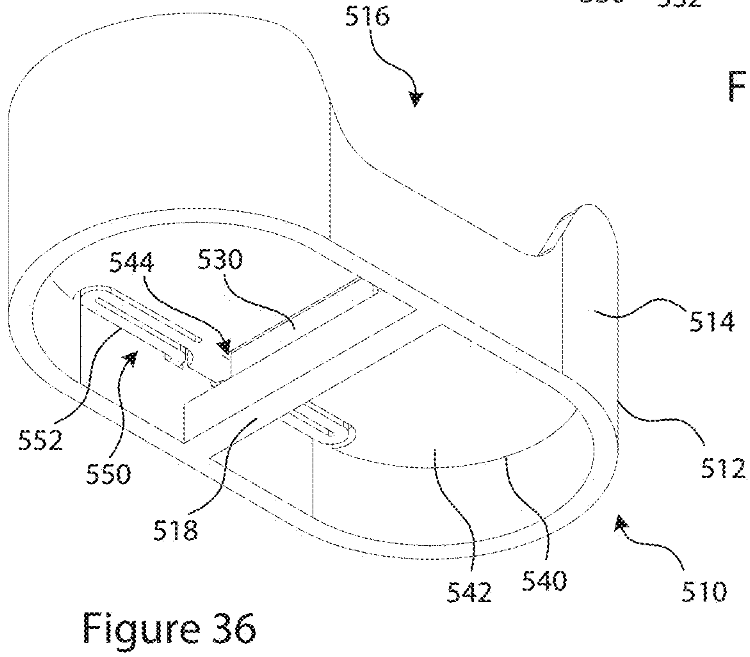
FIG. 36 is another perspective view of the first housing of FIG. 35.

The first housing 510 can further include a spring device 550, which can include a set of springs 552, such as the set of four springs illustrated in FIG. 36. Each spring 552 can extend in a circuitous path from the platform 540 to the foundation 512. For example, each spring 552 can extend from the platform 540 in a first direction (such as to the left or right) and can then curve and extend in an opposite second direction (such as to the right or the left), and can then curve again to extend in a third direction that is different from the first or second directions (such as perpendicular to the first and second directions) to meet the wall 514 of the foundation 512. The spring device 550 can be integrally formed with one or both of the foundation 512 and the platform 540. For example, the foundation 512, the platform 540, and the spring device 550 may all be formed as a single unitary part. Alternatively, the spring device 550 and the platform 540 may be formed as a unitary part, and the springs 552 of the spring device 550 may be secured to the foundation, such as by extending into holes in the foundation 512 and/or being secured thereto with adhesives or some other securing technique. The spring device 550 can bias the platform 540 up toward a hiding position in which the cutting edge 532 of the first blade 530 can be hidden below the platform 540. However, the spring device can allow the platform 540 to be pushed downward against the biasing force of the spring device 550 to an exposing position in which the cutting edge 532 of the first blade 530 can be exposed above the platform 540, through the blade access slot 544.

The platform 540 may further include a stationary pill positioning device 560, which can include a pair of fixed pill positioning walls 562 that extend forward and out from a central portion of the rear of the platform 540, on each side of the blade access slot 544. Accordingly, a pill can be centered over the first blade 530 by pushing the pill rearward against the fixed pill positioning walls 562.

The third pill splitter 500 can also include a second housing 580 that is like the second housing 480 of the second pill splitter 400. The second housing 580 can include a wall 582 that can be oriented vertically and continuously extend around the wall of the foundation 512. The second housing 580 can also include a blade support 583, which can include a pair of protrusions 584, with one protrusion 584 extending forward from a central upper portion of a rear side of the wall 582 and another protrusion 584 extending rearward from a central upper portion of a front side of the wall 582. Each of the protrusions 584 can define a blade support slot that opens downwardly. Additionally, the blade support 583 can include a brace 588 that extends between upper portions of the protrusions 584. A second blade 590 can be seated in the blade support slots of the protrusions 584, and a top of the second blade 590 can extend along a bottom surface of the brace 588. The second blade 590 and the first blade 530 can each be secured in place in one or more ways, such as the ways of securing blades described above with respect to the first pill splitter 100. With the second housing 580 positioned on the first housing 510, the second blade 590 can be positioned above and coplanar with the first blade 530, as illustrated in FIGS. 38-39.

B. Use of the Third Pill Splitter

Figure 37:
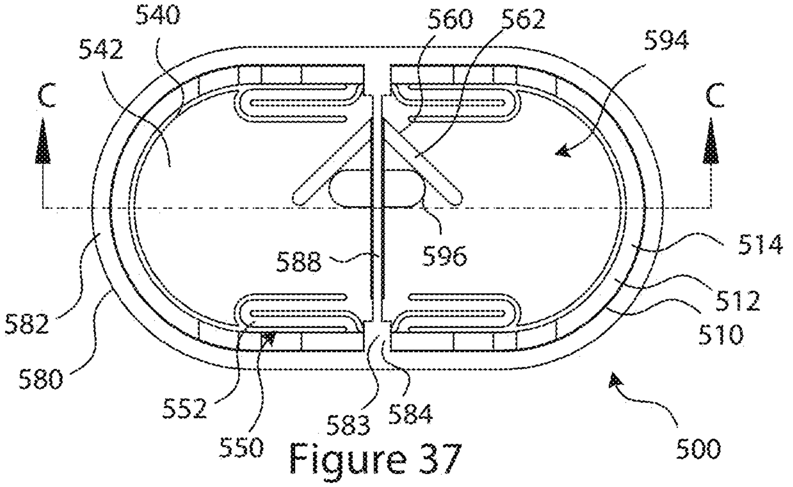
FIG. 37 is a top view of the pill splitter whose first housing is illustrated in FIGS. 35-36.

Use of the third pill splitter 500 will now be discussed with reference to FIGS. 37-39. A pill 596 can be positioned on the platform 540 over the first blade 530 with the foundation 512 positioned on the support surface 114. The stationary pill positioning device 560 can assist in positioning the pill 596. For example, the pill 596 may be placed against the fixed pill positioning walls 562.

Figure 38:
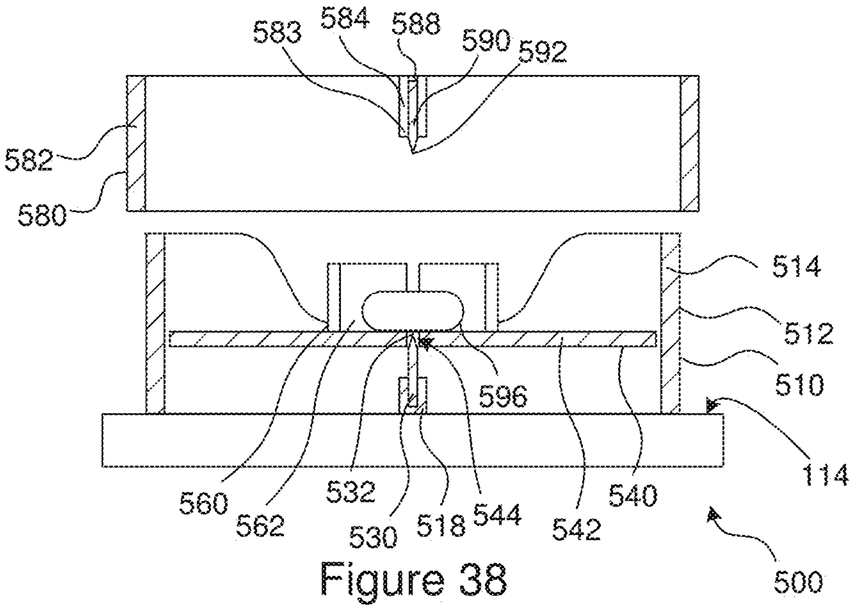
FIG. 38 is a sectional view of the pill splitter of FIG. 37, illustrating the pill splitter in an open position with a pill being supported on a platform of the pill splitter for splitting.
Figure 39:
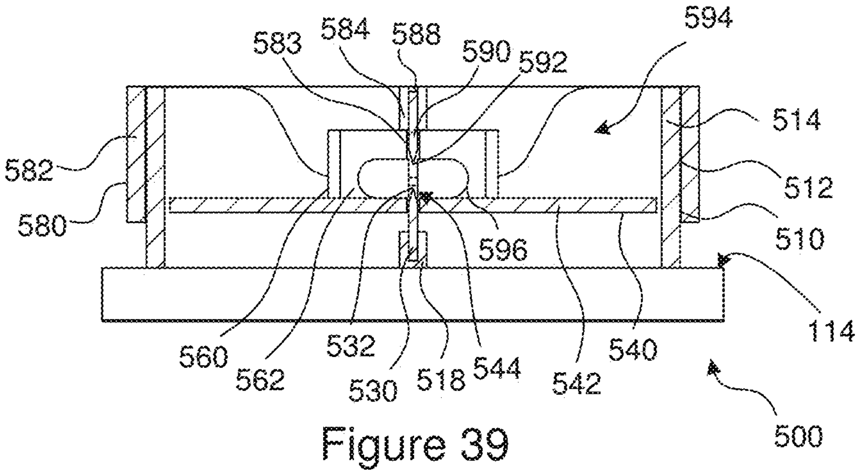
FIG. 39 is a sectional view like FIG. 38, except illustrating the pill splitter in a closed position to expose the second blade so that the first and second blades cut into the pill. For the sake of simplicity, FIG. 39 does not illustrate the springs extending above the platform, although the springs would likely do so in the closed position so that the springs on one side would be visible in a view like FIG. 39.
Figure 40:
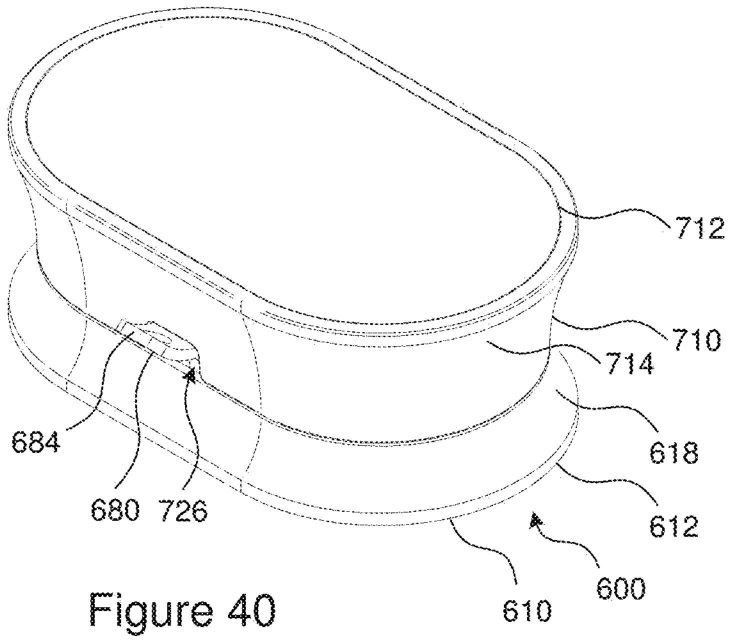
FIG. 40 is a perspective view of a fourth example of a pill splitter.
Figure 41:
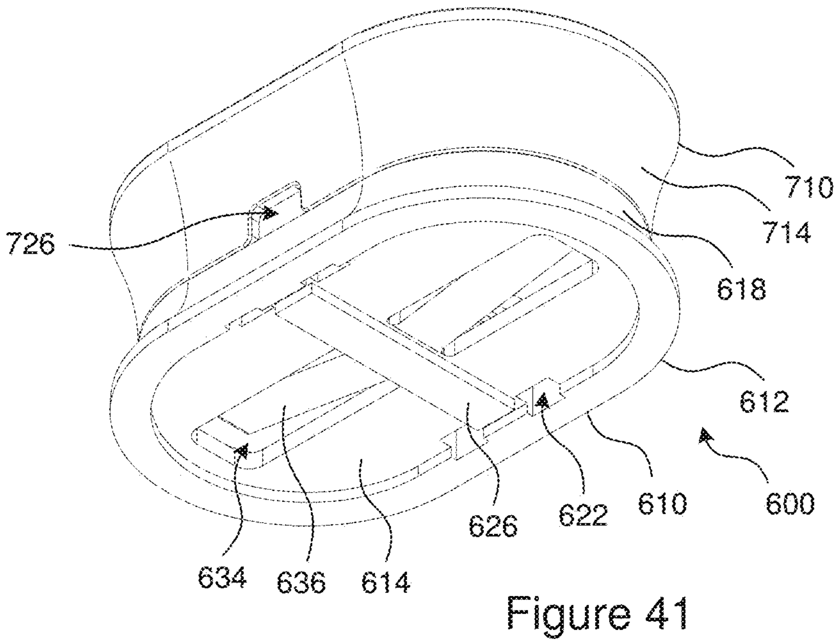
FIG. 41 is another perspective view of the pill splitter of FIG. 40.
Figure 42:
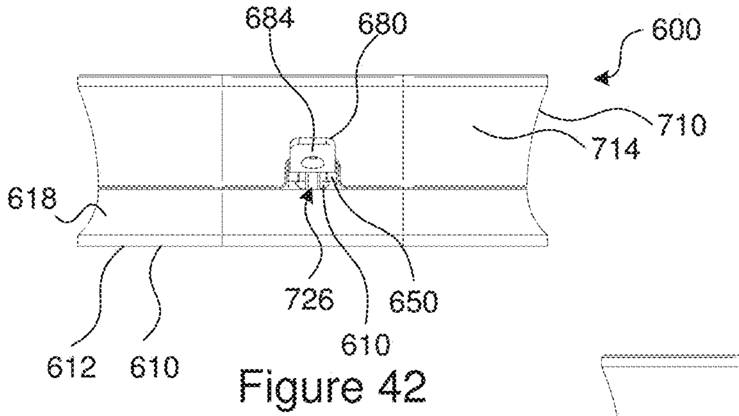
FIG. 42 is a front view of the pill splitter of FIG. 40.
Figure 43:
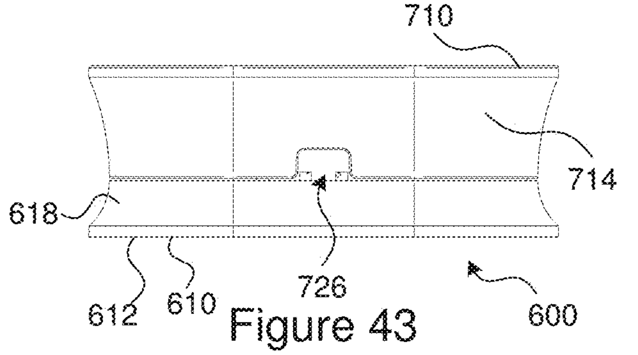
FIG. 43 is a rear view of the pill splitter of FIG. 40.
Figure 44:
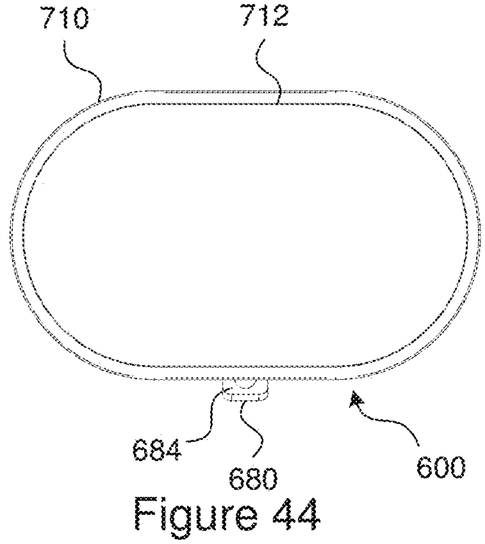
FIG. 44 is a top view of the pill splitter of FIG. 40.
Figure 45:
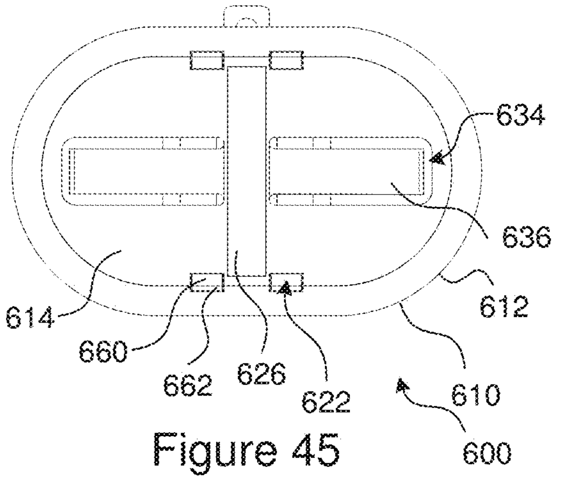
FIG. 45 is a bottom view of the pill splitter of FIG. 40.
Figure 46:
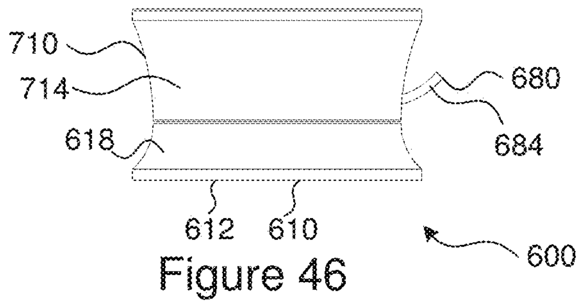
FIG. 46 is a right-side view of the pill splitter of FIG. 40. The left-side view of the pill splitter of FIG. 40 is the mirror image of the right-side view of FIG. 46.

For splitting the pill 496, as illustrated in FIGS. 38-39, the second housing 580 can be slid downward onto the first housing 510 until the second blade 590 contacts a top surface of the pill 596. A user can continue to push down on the second housing 580, which can push the second blade 590 against the pill 596, with the pill 596 in turn pushing down on the platform 540 until the pill 596 contacts the first blade 530 (the exposed position, or blade-exposing position of the platform 540). Continued pushing down on the second housing 580 can cause the first blade 530 to cut into a bottom surface of the pill 596 and can cause the second blade 590 to cut into a top surface of the pill 596, and continued force can cause the pill 596 to spilt as illustrated in FIG. 34. With the pill 496 split, the spring device 550 can push the platform 540 back up to the hiding position, where the platform 540 can hide the first blade 530.

Accordingly, as with the first pill splitter 100, the third pill splitter 500 can allow a user to split a pill by applying a downward force, rather than needing to squeeze the pill splitter. This can allow for easier pill splitting for many users. Additionally, allowing for this type of splitting with two blades cutting into the pill can make pill splitting even easier for a user, and can allow for a precise cut as the pill splits between the two blades. Accordingly, the second pill splitter 400 can provide substantial benefits, and additional features of the pill splitter can provide benefits alone, in combination with this overall downward-pushing two-blade feature, and/or in combination with other advantageous features discussed herein.

The third pill splitter 500 can also work as a pill container to hold pills in a pill container space 594 (above the platform 540 and in the space defined by the wall 514 of the foundation 512), and the pill container space 594 can also contain parts of the pill during pill splitting, although the pill container space 594 may not be fully enclosed.

C. Third Pill Splitter Manufacturing and Materials

The third pill splitter 500 can be made with materials and manufacturing techniques like those discussed above for the first pill splitter 100 and the second pill splitter 400.

IV. Fourth Pill Splitter Example

A. Fourth Pill Splitter Structure

Figure 47:
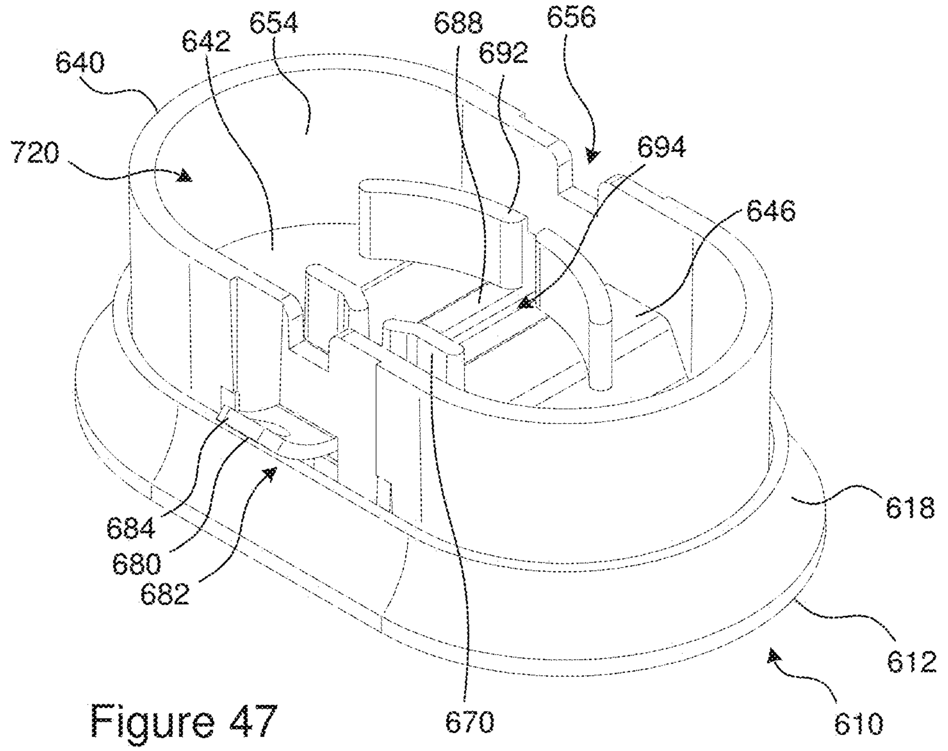
FIG. 47 is a perspective view of a first housing of the pill splitter of FIG. 40.
Figure 48:
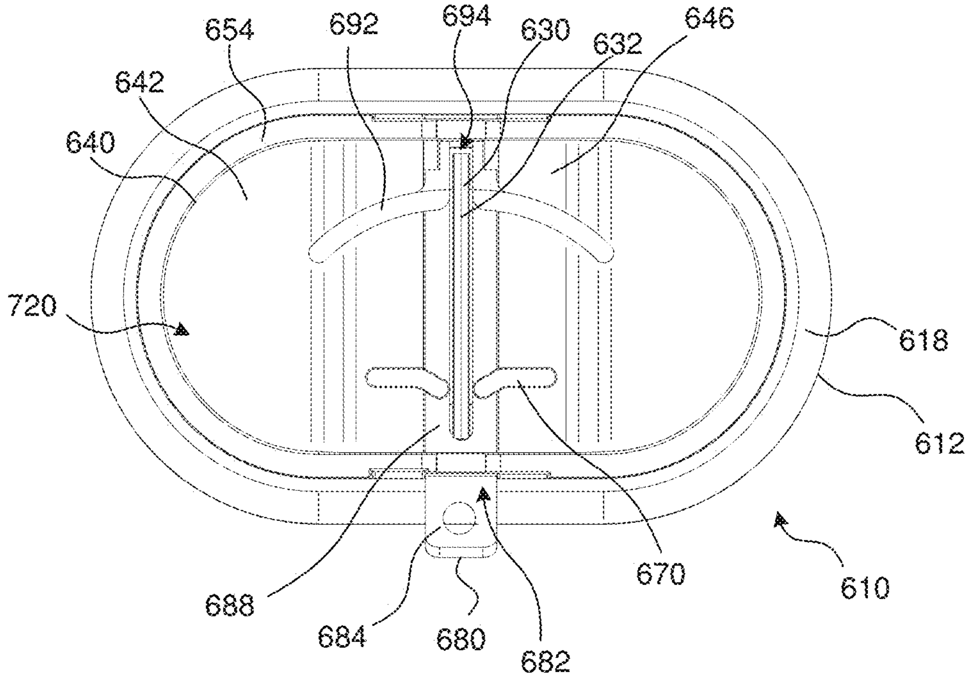
FIG. 48 is a top view of the first housing of FIG. 47.
Figure 49:
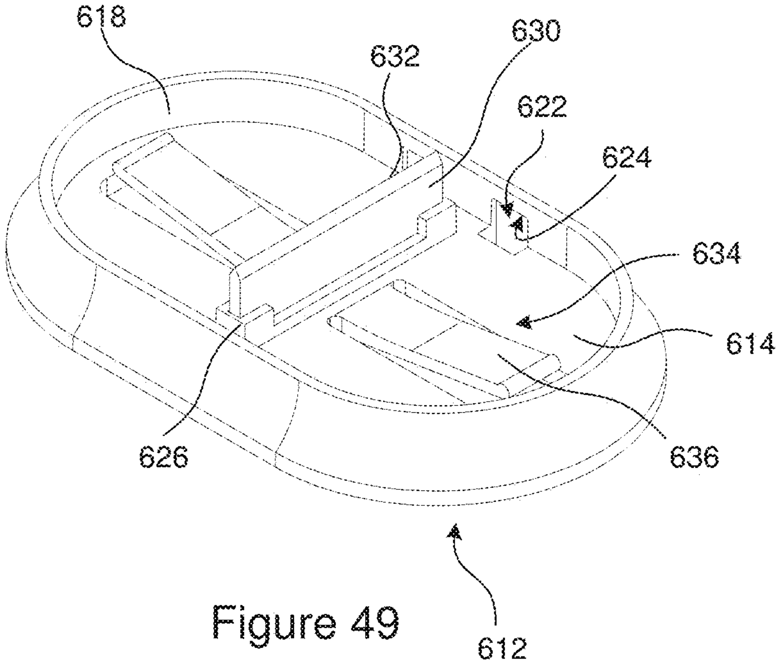
FIG. 49 is a perspective view of a foundation of the first housing of FIG. 47.
Figure 50:
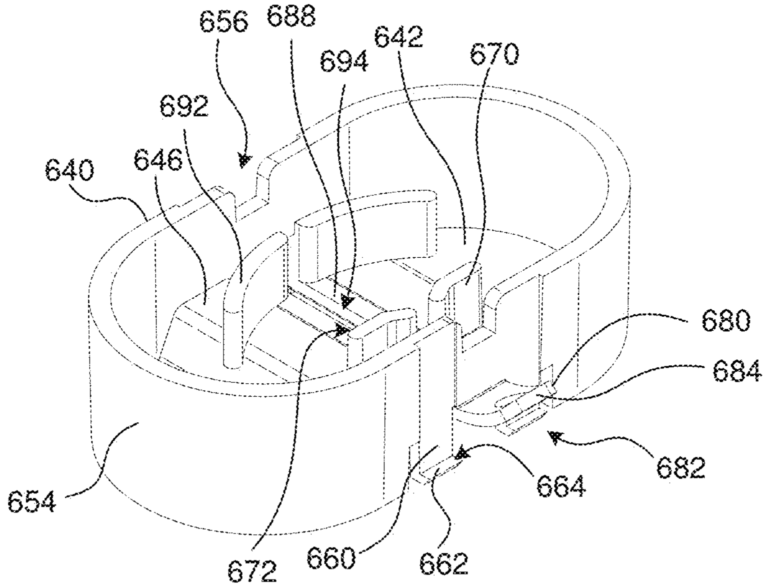
FIG. 50 is a perspective view of a platform and pill positioning device of the first housing of FIG. 47.
Figure 51:
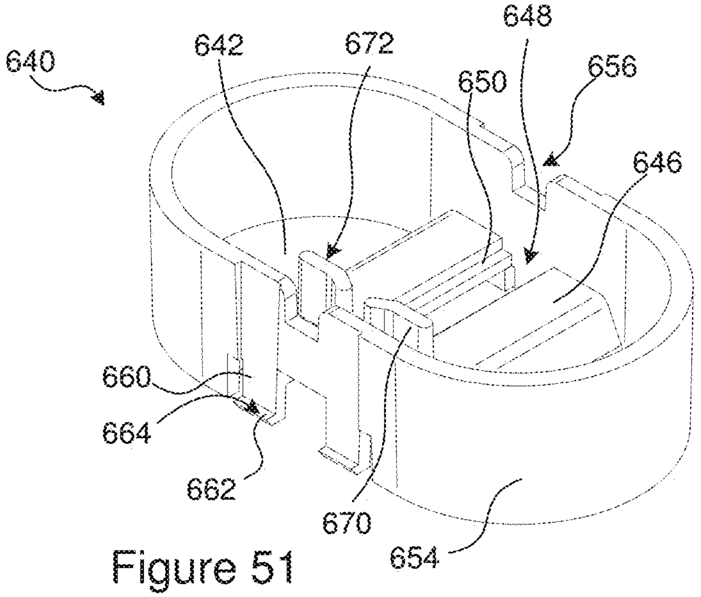
FIG. 51 is a perspective view of the platform illustrated in FIG. 50.
Figure 52:
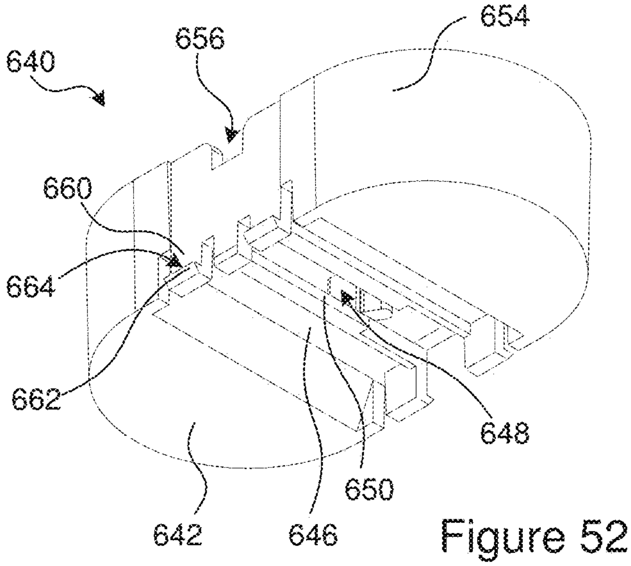
FIG. 52 is another perspective view of the platform of FIG. 51.
Figure 53:
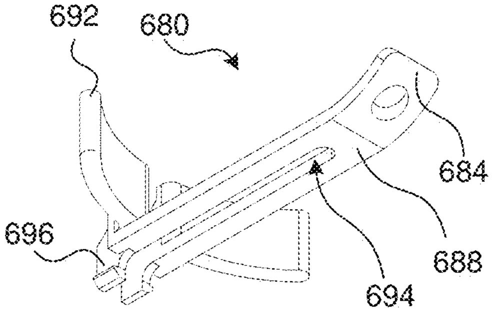
FIG. 53 is a perspective view of a pill positioner from the pill positioning device illustrated in FIG. 50.
Figure 54:
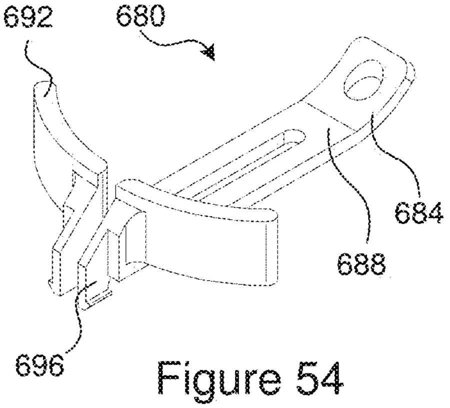
FIG. 54 is another perspective view of the pill positioner of FIG. 53.

Referring now to FIGS. 40-57, a fourth example of a fourth pill splitter 600 will be discussed. The fourth pill splitter 600 can include a first housing 610 (shown assembled in FIGS. 47-48). The first housing 610 can include a foundation 612 (see, e.g., FIG. 49), which can include a foundation floor 614 that can include a central rectangular area and a pair of rounded areas or lobes, which can be semi-circular, at its left and right ends. A wall 618 can extend up and down from a periphery of the foundation floor 614 so that the foundation floor 614 can be suspended above a surface upon which the foundation 612 is resting. The foundation 612 can define access recesses 622 that can each extend into a portion of the wall 618 from its interior surface and can extend down through an outer portion of the foundation floor 614. A downwardly-facing surface that defines a top of each access recess 622 can act as a platform engaging surface 624.

The foundation 612 can further include a blade support 626, which can be centrally located between left and right ends of the foundation floor 614 and can extend front-to-rear as well as above and below the foundation floor 614. The blade support 626 can define a slot within which a first blade 630 can be seated. The first blade 630 can extend up to a cutting edge 632, like the first blades discussed above.

The first housing 610 can further include a spring device 634. The spring device 634 can include a pair of cantilevered springs 636 that can each be secured to the blade support 626 of the foundation 612 and can extend up and out (up and left or right in the illustrated example) from the blade support 626. Thus, the cantilevered springs 636 can each extend above the foundation floor 614 of the foundation 612.

The first housing 610 can further include a platform 640, which can include a platform floor 642. The platform floor 642 can be generally shaped similarly to the foundation floor 614 of the foundation 612. However, the platform floor 642 can be smaller than the foundation floor 614 of the foundation 612. The platform floor 642 of the platform 640 can include a raised central portion forming a ridge 646 extending from front to rear. The ridge 646 can define a slot 648 therein that extends in a front-to-rear direction. Additionally, the ridge 646 can include support ledges 650 extending into the slot 648 from opposite left and right sides of the slot 648. An upper surface of each support ledge 650 can be positioned below an upper surface of the ridge 646 adjacent to each support ledge 650. The support ledges 650 can extend forward from a rear side of the platform floor 642, but the support ledges 650 can terminate before reaching a front side of the platform floor 642.

The platform 640 can also include a platform wall 654, which can extend up from a periphery of the platform floor 642. The platform wall 654 can define a pair of cutouts 656 that extend downwardly and are centrally located between left and right ends of the platform wall 654, with one cutout 656 on a front portion of the platform wall 654 and one cutout 656 on a rear portion of the platform wall 654.

The platform 640 can also include platform fingers 660, with a pair of the platform fingers 660 descending from a front end of the ridge 646 of the platform floor 642 and a pair of the platform fingers 660 descending from a rear end of the ridge 646. The platform fingers 660 can each include a protrusion 662 near the bottom terminus of the platform finger 660 that extends outward and away from a center of the platform 640. Each protrusion 662 can include a foundation engaging surface 664 that faces upwardly and extends horizontally out from a body of the platform finger 660 and a sloped surface that extends in and down from an outer terminus of the foundation engaging surface 664. The foundation engaging surface 664 of each platform finger 660 can abut a platform engaging surface 624 of the foundation 612 in the blade hiding position, which can oppose the force of the spring device 634 (wherein each of the cantilevered springs 636 can bias the platform 640 upward to a blade hiding position) and inhibit a complete separation of the platform 640 from the foundation 612. However, the platform 640 can be allowed to move downward from the blade hiding position, with the platform fingers 660 sliding within the access recesses 622 and the platform 640 sliding up and down within the wall 618 of the foundation 612.

The platform 640 can further include fixed pill positioning walls 670, with one fixed pill positioning wall 670 extending up from the ridge 646 on each side of the slot 648. The fixed pill positioning walls 670 can generally extend rearward toward a rear of the ridge 646 as they extend out to the sides of the slot 648. Accordingly, as a pill is pushed forward against the fixed pill positioning walls 670, the pill can tend to slide toward the center, so that the pill is centered over the slot 648. Rearward-facing surfaces 672 of the fixed pill positioning walls 670 can be generally convex, with each rearward-facing surface 672 including a first section that angles forward and out from the slot 648 and a second section that extends to the left or right away from the slot 648 (such as where the second section can extend perpendicular to the slot 648).

The first housing can further include a pill positioner 680, which can act together with the fixed pill positioning walls as a pill positioning device 682. The pill positioner 680 can be configured to move up and down with the platform 640 upon which it is mounted but can move horizontally relative to the platform 640. The pill positioner 680 can include a tab 684 that can curve upwardly as it extends forward to be grasped as a handle for the pill positioner 680. Additionally, the pill positioner 680 can include a plate 688, which can extend rearward from the tab 684 within the slot 648 and along the top surfaces of the support ledges 650. Moveable pill positioning walls 692 can be fixed to the rear end of the plate 688 and can extend up from the plate as well as extending forward as they extend outward from a blade slot 694 that can extend front-to-rear along the plate 688. The blade slot 694 can extend through the plate 688 and between the moveable pill positioning walls 692. Also, the blade slot 694 can align with the slot 648 of the platform 640, allowing the first blade 630 to extend through the blade slot 694 and the slot 648 when the platform 640 is pushed down to expose the first blade 630. The curvature of the moveable pill positioning walls 692 and the fixed pill positioning walls 670 can be seen in FIG. 48.

The pill positioner 680 can further include a pair of engaging fingers 696 rearward of the moveable pill positioning walls 692, with each of the engaging fingers 696 extending down and then outward to engage downwardly-facing surfaces of the support ledges 650, helping to inhibit vertical movement of the pill positioner 680 relative to the platform 640. The fixed pill positioning walls 670 and the pill positioner 210 can cooperate to center a pill over the blade slot 694, the slot 648, and the first blade 630. Thus, the fixed pill positioning walls 670 and the pill positioner 680 together form the pill positioning device 682, which can be a mechanism with the pill positioner 680 moving relative to the fixed pill positioning walls 670 to initially position and to hold pills of different shapes and sizes in a centered position.

Figure 55:
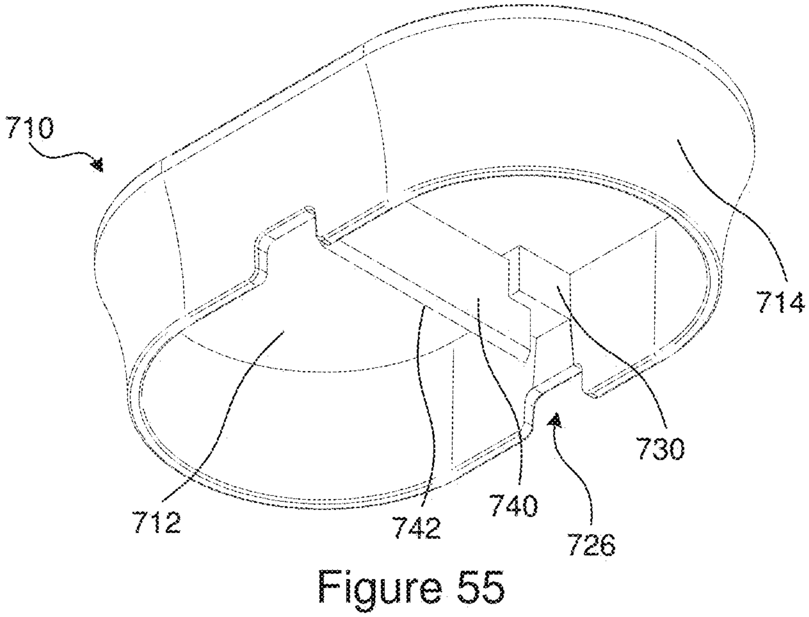
FIG. 55 is a perspective view of a second housing of the pill splitter of FIG. 40.
Figure 56:
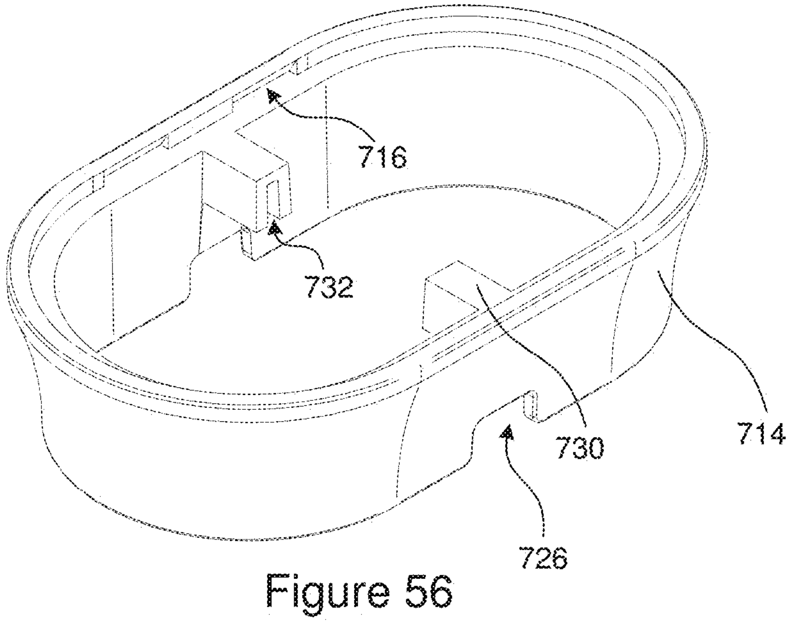
FIG. 56 is a perspective view of a wall and blade support from the second housing of FIG. 55.
Figure 57:
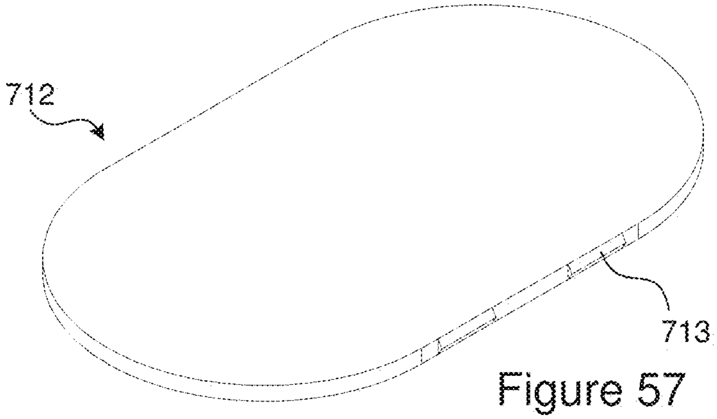
FIG. 57 is a perspective view of a ceiling of the second housing of FIG. 55.

Referring now to FIGS. 55-57 and still to FIGS. 40-46, a second housing 710 will be discussed. The second housing 710 can act as a lid for the fourth pill splitter 600 and can also act as a blade holder, as with the second housings discussed above. The second housing 710 can include a ceiling 712 that can be shaped similarly to the foundation floor 614 and the platform floor 642. The ceiling 712 can include two pairs of protrusions 713 extending out from opposite sides of the ceiling 712. The second housing 710 can also include a wall 714 that extends down from a periphery of the ceiling 712, with the wall 714 being sized and shaped so that the wall 714 of the second housing 710 can extend along the outside of the platform wall 654. The wall 714 can also include recesses 716 into which the protrusions 713 of the ceiling 712 can extend to secure the ceiling 712 to the wall 714.

In a closed position, as illustrated in FIGS. 55-57, a lower edge of the wall 714 of the second housing 710 can rest on a ledge of the foundation 612, which is similar to the ledge 122 of the foundation 112 of the first pill splitter 100. In this closed position, the second housing 710 and the first housing 610 can cooperate to define a pill container space 720, which can be a fully enclosed space in this example, although the pill container space 720 may not be a fully enclosed space if the ceiling 712 is removed or omitted.

The wall 714 of the second housing 710 can define cutouts 726 that extend upwardly and can align with an access cutout in the front section of the platform wall 654 through which the plate 688 of the pill positioner 680 can extend. Thus, the plate 688 and/or the tab 684 of the pill positioner 680 can extend through one of the cutouts 726 in the second housing 710 when the fourth pill splitter 600 is in the closed position.

The second housing 710 can also include blade supports 730, which can extend forward from the rear portion of the wall 714 and rearward from the front portion of the wall 714. The blade supports 730 can define slots 732 that open downwardly. A second blade 740 can be seated in the slots 732 of the blade supports 730 and can extend down therefrom and narrow to a cutting edge 742 that can face downwardly. The second blade 740 can be positioned above the first blade 630 with the first blade 630 and the second blade 740 being aligned in a plane. As the second housing 710 slides down onto the first housing 610, the cutting edges of the second blade 740 and the first blade 630 can remain aligned and move toward each other.

B. Use of Fourth Pill Splitter

The fourth pill splitter 600 can be used similarly to the other pill splitter examples discussed above, with similar parts (and similarly-named parts) performing similar functions during use.

C. Fourth Pill Splitter Manufacturing and Materials

The fourth pill splitter 600 can be made with materials and manufacturing techniques like those discussed above for the first pill splitter 100.

In assembling the fourth pill splitter 600, the blades can be assembled and secured similarly to the techniques discussed above with respect to the blades of the other pill splitter examples. The ceiling 712 of the second housing 710 can be snapped into place in the wall 714 of the second housing 710.

The tab 684 of the pill positioner 680 can inserted downwardly through the slot 648 in the ridge 646 of the platform 640, forward of the support ledges 650. The rear of the pill positioner 680 can then be pressed downwardly to allow the engaging fingers 696 to engage the downwardly-facing surfaces of the support ledges 650. Thus, the plate 688 of the pill positioner 680 can be positioned within the slot 648 and can slide forward and rearward along the slot 648.

The platform 640 can then be pressed into the foundation 612 so that the platform fingers 660 can extend into the access recesses 622 of the foundation 612. The second housing 710 can then be slid downward onto the first housing 610 to form the closed position for the fourth pill splitter 600.

While embodiments are discussed above, it will be understood by those skilled in the art that various changes in form and details may be made therein without departing from the spirit and scope of the invention. For example, some of the platforms are illustrated as being flat, but the platform may be different shapes, such as curved shapes, so long as the platform is configured to support a pill as discussed herein. As another example, instead of the platforms including fingers and protrusions to extend into apertures in the foundation to secure the platform to the foundation but still allow movement of the platform relative to the foundation, this could be reversed, with the foundation including fingers and protrusions to extend into apertures in the platform to help secure the platform to the foundation but to allow movement of the platform relative to the foundation.

I claim:

1. A pill splitter comprising:

a first housing comprising a platform, the platform being moveable relative to a foundation of the first housing;

a pill positioner that is moveable relative to the platform;

a second housing that is slidable along the first housing in a linear direction between an open position and a closed position, one or both of the second housing and the first housing defining a pill container space in the closed position;

a first blade secured to the first housing; and a second blade secured to the second housing, wherein the pill splitter is structured so that sliding of the second housing along the first housing in the linear direction toward the closed position moves the platform relative to the foundation of the first housing and brings the second blade toward the first blade to split a pill held in a set position against the platform by the pill positioner, with both a cutting edge of the second blade and a cutting edge of the first blade being structured to cut into the pill.

2. The pill splitter of claim 1, wherein the first blade and the second blade each comprise metal, and wherein the first housing and the second housing each comprise polymer.

3. The pill splitter of claim 1, wherein the pill splitter comprises a guide that is configured to align the second housing and the first housing with a cutting edge of the second blade being aligned in a plane with a cutting edge of the first blade.

4. The pill splitter of claim 1, wherein the linear direction of the sliding of the second housing relative to the first housing is a first direction, and wherein the pill positioner is moveable relative to the platform of the first housing in a second direction that is different from the first direction, with the platform of the first housing being structured to support the pill while the second blade is brought toward the first blade with the second housing sliding toward the closed position, and wherein the platform is moveable in the linear direction of the sliding of the second housing relative to the first housing to expose or hide the first blade.

5. The pill splitter of claim 1, wherein the platform is structured to support the pill while the second blade is brought toward the first blade with the second housing sliding toward the closed position, wherein the platform is moveable relative to a foundation of the first housing in the linear direction of the sliding of the second housing relative to the first housing to expose or hide the first blade.

6. The pill splitter of claim 1, further comprising a protrusion that is integrally formed with one of the foundation or the platform, and wherein the protrusion extends into an aperture in the other of the foundation or the platform to allow movement of the platform relative to the foundation but to inhibit separation of the platform from the foundation.

7. The pill splitter of claim 1, wherein the platform is moveable relative to the first blade, such that the platform is moveable between a hiding position in which the platform hides the first blade and an exposing position in which the platform exposes the first blade, and wherein the pill splitter comprises a spring device, with the spring device biasing the platform relative to the foundation toward the hiding position.

8. The pill splitter of claim 7, wherein the spring device comprises a spring that is integrally formed with at least one of the foundation or the platform.

9. The pill splitter of claim 7, wherein the spring device comprises a plurality of springs.

10. The pill splitter of claim 7, wherein the spring device comprises a plurality of springs integrally formed with at least one of the foundation or the platform.

11. The pill splitter of claim 1, wherein, in the open position the second housing is fully detached from the first housing.

12. The pill splitter of claim 11, wherein, in the closed position, the second housing forms a lid on the first housing to at least partially define the pill container space.

13. The pill splitter of claim 1, wherein the pill splitter further comprises the pill.

14. A pill splitter comprising:

a first housing comprising a platform;

a first blade secured to the first housing;

a second housing structured to slide relative to the first housing in a direction from an open position to a closed position in which one or both of the second housing and the first housing comprise one or more surfaces that define a pill container space; and a second blade secured to the second housing, the pill splitter being structured so that moving of the second housing in the direction toward the closed position, with a pill being supported by the platform, splits the pill by bringing the second blade toward the first blade with both a cutting edge of the second blade and a cutting edge of the first blade cutting into the pill, with the platform moving relative to a foundation of the first housing in the direction, and with the moving of the platform exposing the first blade during the moving of the second housing toward the closed position;

wherein the first housing further comprises a protrusion that is integrally formed with one of the foundation or the platform, and wherein the protrusion extends into an aperture in the other of the foundation or the platform to allow movement of the platform relative to the foundation during the moving of the second housing toward the closed position but to inhibit separation of the platform from the foundation.

15. The pill splitter of claim 14, wherein the direction is a linear direction and wherein the moving of the second housing toward the closed position comprises sliding the second housing along the first housing in the linear direction.

16. The pill splitter of claim 14, wherein, in the open position the second housing is fully detached from the first housing.

17. The pill splitter of claim 14, wherein the first blade has a surface hardness greater than a surface hardness of a portion of the first housing that is proximate to the first blade, and wherein the second blade has a surface hardness greater than a surface hardness of a portion of the second housing that is proximate to the second blade.

18. The pill splitter of claim 14, wherein the first housing comprises a pill positioner, the pill positioner being structured to hold the pill in a set position in the first housing during the moving of the second housing toward the closed position.

19. The pill splitter of claim 18, wherein:

the direction is a first direction; and the pill positioner is moveable relative to a platform of the first housing in a second direction that is different from the first direction to hold the pill in the set position, with the platform of the first housing being structured to support the pill positioner and the pill.

20. The pill splitter of claim 14, wherein the pill splitter further comprises the pill.

* * * * *